(12) United States Patent
Zhang et al.

(10) Patent No.: US 11,381,291 B2
(45) Date of Patent: Jul. 5, 2022

(54) CHANNEL STATE MEASUREMENT METHOD AND APPARATUS

(71) Applicant: HUAWEI TECHNOLOGIES CO., LTD., Guangdong (CN)

(72) Inventors: Ruiqi Zhang, Beijing (CN); Xueru Li, Beijing (CN); Di Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 311 days.

(21) Appl. No.: 16/715,821

(22) Filed: Dec. 16, 2019

(65) Prior Publication Data

US 2020/0119795 A1 Apr. 16, 2020

Related U.S. Application Data

(63) Continuation of application No. PCT/CN2018/091603, filed on Jun. 15, 2018.

(30) Foreign Application Priority Data

Jun. 16, 2017 (CN) .......................... 201710458108.9

(51) Int. Cl.
*H04B 7/06* (2006.01)
*H04L 5/00* (2006.01)
(Continued)

(52) U.S. Cl.
CPC .......... *H04B 7/0626* (2013.01); *H04B 7/0413* (2013.01); *H04L 5/0048* (2013.01);
(Continued)

(58) Field of Classification Search
CPC .......... H04B 7/02–0413; H04B 7/0452; H04B 7/0626; H04L 5/0048–0057; H04W 24/00; H04W 24/08; H04W 24/10
See application file for complete search history.

(56) References Cited

U.S. PATENT DOCUMENTS

2012/0327800 A1   12/2012   Kim et al.
2013/0196675 A1*   8/2013   Xiao ..................... H04W 24/08
                                                        455/452.1
(Continued)

FOREIGN PATENT DOCUMENTS

CN   103797880 A   5/2014
CN   104935389 A   9/2015
(Continued)

OTHER PUBLICATIONS

Performance analysis of interference estimation in NR, May 15-19, 2017, 3GPP TSG RAN WG1#89, pp. 1-6 (Year: 2017).*
(Continued)

*Primary Examiner* — Michael Thier
*Assistant Examiner* — Prince A Mensah
(74) *Attorney, Agent, or Firm* — Fish & Richardson P.C.

(57) ABSTRACT

The present disclosure relates to channel state measurement methods and apparatus. One example method includes selecting, by a network device from N channel state information reference signal (CSI-RS) resources, a target CSI-RS resource and a target channel state information-interference measurement (CSI-IM) resource group associated with the target CSI-RS resource, where an $i^{th}$ CSI-RS resource in the N CSI-RS resources is associated with $n_i$ CSI-IM resource groups, and a $k^{th}$ CSI-IM resource group in the $n_i$ CSI-IM resource groups includes $x_{ik}$ CSI-RS resources in the N CSI-RS resources except the $i^{th}$ CSI-RS resource, and sending, by the network device, first indication information by using first signaling, where the first indication information indicates the target CSI-RS resource and the target CSI-IM resource group.

18 Claims, 11 Drawing Sheets

CSI-RS resources

CSI-IM resource groups

CSI-RS resources

CSI-IM resource groups

(51) Int. Cl.
    *H04B 7/0413*     (2017.01)
    *H04W 24/08*     (2009.01)
    *H04W 24/10*     (2009.01)

(52) U.S. Cl.
    CPC ........... *H04L 5/0057* (2013.01); *H04W 24/08* (2013.01); *H04W 24/10* (2013.01)

(56) References Cited

U.S. PATENT DOCUMENTS

| | | | | |
|---|---|---|---|---|
| 2016/0105817 A1* | 4/2016 | Frenne | .................. | H04L 1/0026 |
| | | | | 370/252 |
| 2016/0112177 A1* | 4/2016 | Zheng | .................. | H04W 72/082 |
| | | | | 370/330 |
| 2016/0301505 A1 | 10/2016 | Furuskog et al. | | |

FOREIGN PATENT DOCUMENTS

| | | | |
|---|---|---|---|
| CN | 106209194 A | 12/2016 | |
| WO | 2016056970 A1 | 4/2016 | |

OTHER PUBLICATIONS

Samsung, "New WID Proposal: Elevation Beamforming/Full-Dimension (FD) MIMO for LTE," 3GPP TSG RAN Meeting #68, RP-151028, Malmö, Sweden, Jun. 15-18, 2015, 7 pages.

Nokia et al., "Performance analysis of interference estimation in NR," 3GPP TSG RAN WG1#89, R1-1708913, Hangzhou, P.R. China, May 15-19, 2017, 6 pages.

NTT Docomo, "On CSI measurement for NR," 3GPP TSG RAN WG1 Meeting #89, R1-1708455, Hangzhou, P.R. China, May 15-19, 2017, 15 pages.

Huawei, HiSilicon, "Interference Measurement Mechanism for Link Adaptation in NR," 3GPP TSG RAN WG1 Meeting #86, R1-167225, Gothenburg, Sweden, Aug. 22-26, 2016, 4 pages.

Extended European Search Report issued in European Application No. 18818284.4 dated Apr. 30, 2020, 7 pages.

PCT International Search Report and Written Opinion issued in International Application No. PCT/CN2018/091603 dated Sep. 7, 2018, 14 pages (with English translation).

\* cited by examiner

CHANNEL STATE MEASUREMENT METHOD AND APPARATUS

CROSS-REFERENCE TO RELATED APPLICATIONS

This application is a continuation of International Application No. PCT/CN2018/091603, filed on Jun. 15, 2018, which claims priority to Chinese Patent Application No. 201710458108.9, filed on Jun. 16, 2017, The disclosures of the aforementioned applications are hereby incorporated by reference in their entireties.

TECHNICAL FIELD

Embodiments of this application relate to the communications field, and in particular, to a channel state measurement method and apparatus in the communications field.

BACKGROUND

In a multiple-input multiple-output (multiple-input multiple-output, MIMO) system, a network device may simultaneously transmit data to a plurality of terminal devices on a same time-frequency resource. In this specification, when a same network device transmits data to a terminal device on a configured time-frequency resource, another terminal device that simultaneously performs data transmission with the network device on the same time-frequency resource is referred to as a paired terminal device of the terminal device. Data received by this terminal device is interfered with by data sent by the network device to the paired terminal device of this terminal device, and such interference is referred to as multi-user interference in this specification. In addition, when a network device of another cell transmits data to a terminal device served by the network device of the another cell, interference to this terminal device is also caused, and such interference is referred to as inter-cell interference. Therefore, when measuring a channel state to obtain a channel quality indicator (channel quality indicator, CQI), in addition to a channel coefficient of a channel from the network device to the terminal device, the terminal device needs to consider the multi-user interference caused by the paired terminal device of the terminal device and inter-cell interference caused when the network device of the another cell transmits data to another terminal device.

The terminal device measures the channel coefficient and the interference on different time-frequency-code resources configured by the network device for the terminal device. For example, the terminal device measures the channel coefficient on a channel state information-reference signal (channel state information-reference signal, CSI-RS) resource configured by the network device for the terminal device, and measures the multi-user interference and the inter-cell interference on a channel state information-interference measurement (CSI interference measurement, CSI-IM) resource configured by the network device for the terminal device. A CSI-RS resource and a CSI-IM resource of a terminal device occupy different time-frequency-code resources. The CSI-IM resource may be a non-zero power (non-zero power, NZP) CSI-RS resource used by the paired terminal device of the terminal device to measure a channel coefficient. To be specific, the paired terminal device of the terminal device measures, on the non-zero power CSI-RS resource, a channel coefficient of a channel from the network device to the paired terminal device, and the terminal device measures, on the non-zero power CSI-RS resource, the multi-user interference caused by the paired terminal device. The CSI-IM resource may alternatively be a zero power (zero power, ZP) CSI-RS resource. To be specific, the network device does not send any signal on the time-frequency-code resource, and the terminal device may measure the inter-cell interference on the zero power CSI-RS resource. The CSI-IM resource configured by the network device for the terminal device may include only the non-zero power CSI-RS resource, or may include only the zero power CSI-RS resource, or may include both the non-zero power CSI-RS resource and the zero power CSI-RS resource, so that the terminal device can measure both the multi-user interference and the inter-cell interference. When the network device configures a non-zero power CSI-RS resource for the terminal device as a CSI-IM resource, such a non-zero power CSI-RS resource can be used to measure interference only from one paired terminal device, because the non-zero power CSI-RS resource is also a CSI-RS resource used by the paired terminal device to measure a channel coefficient. At different moments, a paired terminal device of a terminal device dynamically changes, and a quantity of paired terminal devices of the terminal device may also dynamically change. Therefore, when configuring a non-zero power CSI-RS resource for the terminal device as a CSI-IM resource, the network device needs to dynamically select, by using signaling, one or more non-zero power CSI-RS resources as CSI-IM resources required by the terminal device.

In a solution in which a CSI-RS resource used for interference measurement is indicated by using a bitmap bitmap, the network device configures N non-zero power CSI-RS resources for the terminal device by using higher layer signaling (such as RRC signaling or MAC CE signaling). The N non-zero power CSI-RS resources are shared by a plurality of terminal devices served by the network device, and not only may be used by the terminal device to measure a channel coefficient, but also may be used by the terminal device to measure multi-user interference and/or inter-cell interference. The network device sets a field in particular signaling such as downlink control information (downlink control information, DCI), and the field is used to place a bitmap. The bitmap includes N bits, and an $i^{th}$ bit indicates, to a terminal device, whether an $i^{th}$ CSI-RS resource in the N CSI-RS resources is configured for the terminal device for interference measurement, where i=1, 2, . . . , N. For example, 0 is used to indicate that the CSI-RS resource is not configured for the terminal device as a CSI-IM resource, and 1 is used to indicate that the CSI-RS resource is configured for the terminal device as a CSI-IM resource. In this manner, the bitmap requires at least N bits. In a next-generation wireless system, a value of N may be relatively large. Consequently, a very large quantity of bits need to be allocated to a bitmap in DCI, causing excessively high bit overheads of the DCI.

SUMMARY

Embodiments of this application provide a channel state measurement method and apparatus, to reduce bit overheads of signaling used by a network device to select a CSI-IM resource, and reduce a payload size (payload size) of the signaling.

According to a first aspect, a channel state measurement method is provided, including: selecting, by a network device from N channel state information-reference signal CSI-RS resources, a target CSI-RS resource and a target channel state information-interference measurement CSI- IM resource group associated with the target CSI-RS resource, where the target CSI-IM resource group includes a CSI-RS resource in the N CSI-RS resources, an $i^{th}$ CSI-RS resource in the N CSI-RS resources is associated with $n_i$ CSI-IM resource groups, and a $k^{th}$ CSI-IM resource group in the $n_i$ CSI-IM resource groups includes $x_{ik}$ CSI-RS resources in the N CSI-RS resources except the $i^{th}$ CSI-RS resource, where N, i, $n_i$, k, and $x_{ik}$ are all integers, N≥2, i=1, 2, ..., N, 1≤$n_i$≤N, k=1, 2, ..., $n_i$, 0≤$x_{ik}$≤N−1, j∈{1, 2, ..., N}, and $n_j$≥2; and sending, by the network device, first indication information by using first signaling, where the first indication information is used to indicate the target CSI-RS resource and the target CSI-IM resource group.

It should be understood that "the target CSI-IM resource group includes a CSI-RS resource in the N CSI-RS resources" means that the CSI-RS resource in the target CSI-IM resource group is selected from the N CSI-RS resources.

It should be further understood that the target CSI-RS resource is used by the terminal device to measure a channel coefficient, and the CSI-RS resource in the target CSI-IM resource group is used by the terminal device to measure interference. In this embodiment of this application, a CSI-IM resource group only functionally represents a part of CSI-RS resources used to measure interference. The CSI-IM resource group may also be referred to as a CSI-IM resource set, a first resource set, a first resource group, or the like. Alternatively, a CSI-IM resource group may be directly referred to as a CSI-IM resource, and the CSI-IM resource includes one or more CSI-RS resources. This is not limited in this embodiment of this application.

In this embodiment of this application, the network device may configure, for the terminal device by using higher layer signaling (such as RRC signaling or MAC CE signaling), the N CSI-RS resources and a CSI-IM resource group associated with at least one of the N CSI-RS resources. Alternatively, the network device and the terminal device may determine, according to a protocol agreement, the N CSI-RS resources and a CSI-IM resource group associated with at least one of the N CSI-RS resources. Each CSI-IM resource group includes a specific quantity of CSI-RS resources, which are used by the terminal device to measure interference. In addition, a quantity of configured CSI-IM resource groups does not exceed N while meeting a requirement for a dynamic change in a quantity of paired terminal devices. In this manner, for the network device, selecting one or more CSI-IM resources means selecting one CSI-IM resource group. Because a quantity of CSI-IM resource groups associated with the at least one CSI-RS resource does not exceed N, the network device allocates one bit to each of the N CSI-RS resources without a need to use a bitmap.

In this embodiment of this application, the network device may configure, for the terminal device by using higher layer signaling (such as RRC signaling or MAC CE signaling), the N CSI-RS resources and a CSI-IM resource group associated with each of the N CSI-RS resources. Alternatively, the network device and the terminal device may determine, according to a protocol agreement, the N CSI-RS resources and a CSI-IM resource group associated with each of the N CSI-RS resources. Each CSI-IM resource group includes a specific quantity of CSI-RS resources, which are used by the terminal device to measure interference. In addition, a quantity of configured CSI-IM resource groups does not exceed N while meeting a requirement for a dynamic change in a quantity of paired terminal devices. In this manner, for the network device, selecting one or more CSI-IM resources means selecting one CSI-IM resource group. Because a quantity of CSI-IM resource groups associated with each CSI-RS resource does not exceed N, the network device allocates one bit to each of the N CSI-RS resources without a need to use a bitmap.

Therefore, according to the channel state measurement method in this embodiment of this application, a CSI-IM resource group associated with each of the N CSI-RS resources is configured in a particular manner, and therefore a quantity of configured CSI-IM resource groups does not exceed the preset quantity N of CSI-RS resources while meeting the requirement for the dynamic change in the quantity of paired terminal devices. In this way, bit overheads used by the network device to select a CSI-IM resource can be reduced, and a payload size of signaling can be reduced, thereby improving system performance.

In a first possible implementation of the first aspect, in $n_j$ CSI-IM resource groups associated with a $j^{th}$ CSI-RS resource in the N CSI-RS resources, different CSI-IM resource groups include different quantities of CSI-RS resources.

Specifically, if at least two CSI-IM resource groups are associated with a CSI-RS resource, different CSI-IM resource groups in the at least two CSI-IM resource groups include different quantities of CSI-RS resources. In this way, the network device may select different CSI-IM resource groups to meet a requirement for a change in a quantity of paired terminal devices, so that a CQI measured by the terminal device is more accurate.

It should be understood that a quantity of CSI-RS resources included in a CSI-IM resource group may directly or indirectly represent a quantity of paired terminal devices. In this way, the network device may select, as the target CSI-IM resource group based on a quantity of paired terminal devices of the terminal device at a current moment, a CSI-IM resource group in which a quantity of included non-zero power CSI-RS resources is equal to the quantity of paired terminal devices.

It should be further understood that the network device may select the target CSI-RS resource and the target CSI-IM resource group in a plurality of manners. Specifically, the network device may first select the target CSI-RS resource, and then select, based on the quantity of paired terminal devices, the target CSI-IM resource group from CSI-IM resource groups associated with the target CSI-RS resource. Alternatively, the network device may first select a plurality of CSI-IM resource groups based on the quantity of paired terminal devices, where the plurality of CSI-IM resource groups are associated with different CSI-RS resources, and then the network device selects the target CSI-RS resource from the CSI-RS resources associated with the plurality of CSI-IM resource groups. Alternatively, the network device may separately select the target CSI-RS resource and the target CSI-IM resource group. Therefore, a process of selecting the target CSI-RS resource and the target CSI-IM resource group is not limited in this embodiment of this application.

With reference to the foregoing possible implementation of the first aspect, in a second possible implementation of the first aspect, identifiers of the N CSI-RS resources are 1, 2, ..., N and represent a CSI-RS resource 1, a CSI-RS resource 2, ..., and a CSI-RS resource N, and a set of identifiers of CSI-RS resources included in the $k^{th}$ CSI-IM resource group in the $n_i$ CSI-IM resource groups associated with the $i^{th}$ CSI-RS resource is:

$$\left\{ \left\lfloor \frac{i-1}{x_{ik}+1} \right\rfloor (x_{ik}+1)+1, \left\lfloor \frac{i-1}{x_{ik}+1} \right\rfloor (x_{ik}+1)+2, \ldots, \left\lfloor \frac{i-1}{x_{ik}+1} \right\rfloor (x_{ik}+1)+x_{ik}+1 \right\} \Big/ \{i\},$$

where a set A/a set B represents a set of remaining elements in the set A after elements in the set B are removed from the set A. In this specification, $\lfloor \alpha \rfloor$ represents rounding down a real number $\alpha$.

As limited in the foregoing formula, identifiers of CSI-RS resources in a CSI-IM resource group are consecutive. In addition, different CSI-IM resource groups associated with a CSI-RS resource include different quantities of CSI-RS resources, so that a quantity of CSI-IM resource groups associated with a CSI-RS resource can be reduced, and a requirement for a change in a quantity of paired terminal devices can be met. Therefore, on a basis of meeting a measurement requirement of the terminal device, a quantity of bits required by the network device to select the target CSI-IM resource group is reduced, and bit overheads of signaling are reduced.

With reference to the foregoing possible implementations of the first aspect, in another possible implementation of the first aspect, $x_{ik}=k-1$, and a set of identifiers of CSI-RS resources included in the $k^{th}$ CSI-IM resource group is:

$$\left\{ \left\lfloor \frac{i-1}{k} \right\rfloor k+1, \left\lfloor \frac{i-1}{k} \right\rfloor k+2, \ldots, \left\lfloor \frac{i-1}{k} \right\rfloor k+k \right\} \Big/ \{i\}.$$

With reference to the foregoing possible implementations of the first aspect, in another possible implementation of the first aspect, $x_{ik}=k$, and a set of identifiers of CSI-RS resources included in the $k^{th}$ CSI-IM resource group is:

$$\left\{ \left\lfloor \frac{i-1}{k+1} \right\rfloor (k+1)+1, \left\lfloor \frac{i-1}{k+1} \right\rfloor (k+1)+2, \ldots, \left\lfloor \frac{i-1}{k+1} \right\rfloor (k+1)+k+1 \right\} \Big/ \{i\}.$$

With reference to the foregoing possible implementations of the first aspect, in a third possible implementation of the first aspect, identifiers of the N CSI-RS resources are 1, 2, . . . , N and represent a CSI-RS resource 1, a CSI-RS resource 2, . . . , and a CSI-RS resource N, a quantity of CSI-IM resource groups associated with the $i^{th}$ CSI-RS resource is $n_i=N+1-i$, and a set of identifiers of CSI-RS resources included in the $k^{th}$ CSI-IM resource group is:

$\{1,2,\ldots,i+k-1\}/\{i\}$, where a set A/a set B represents a set of remaining elements in the set A after elements in the set B are removed from the set A.

As limited in the foregoing formula, identifiers of CSI-RS resources in a CSI-IM resource group are consecutive. In addition, the identifiers of the CSI-RS resources in the CSI-IM resource group are configured from a minimum value that can be used among 1, 2, . . . , N. In this way, a quantity of CSI-IM resource groups associated with a CSI-RS resource can be further reduced, so that bit overheads of signaling used by the network device to select the target CSI-IM resource group are reduced.

With reference to the foregoing possible implementations of the first aspect, in a fourth possible implementation of the first aspect, the N CSI-RS resources are non-zero power CSI-RS resources, and each CSI-IM resource group further includes a zero power CSI-RS resource.

It should be understood that a non-zero power CSI-RS resource included in each CSI-IM resource group is used to measure first-type interference, and the zero power CSI-RS resource is used to measure second-type interference. The first-type interference includes multi-user interference, and the second-type interference includes inter-cell interference. It should be understood that the network device does not send any reference signal on the zero power CSI-RS resource, and the zero power CSI-RS resource is merely used by the network device to measure inter-cell interference. When the network device configures a zero power CSI-RS resource, each CSI-IM resource group includes the zero power CSI-RS resource. However, this is not limited in this embodiment of this application.

With reference to the foregoing possible implementations of the first aspect, in a fifth possible implementation of the first aspect, before the selecting, by a network device from N channel state information-reference signal CSI-RS resources, a target CSI-RS resource and a target channel state information-interference measurement CSI-IM resource group associated with the target CSI-RS resource, the method further includes: sending, by the network device, first configuration information by using second signaling, where the first configuration information is used to configure the N CSI-RS resources.

Specifically, the network device may configure the N CSI-RS resources for the terminal device by using signaling. Configuration information of a CSI-RS resource includes a plurality of pieces of information, for example, an identifier of the CSI-RS resource, a quantity of ports of the CSI-RS resource, and a time-frequency resource occupied by the CSI-RS resource. It should be understood that the configuration information may further include other information. This is not limited in this embodiment of this application.

With reference to the foregoing possible implementations of the first aspect, in a sixth possible implementation of the first aspect, the second signaling is radio resource control (radio resource control, RRC) signaling.

Specifically, because a CSI-RS resource remains unchanged in a short time once being configured, the network device may configure the N CSI-RS resources by using higher layer signaling. Overheads of dynamic signaling (for example, physical layer downlink control information DCI) can be greatly reduced by configuring the N CSI-RS resources by using the higher layer signaling, because only selection of a CSI-RS resource from the configured N CSI-RS resources is required for the dynamic signaling.

With reference to the foregoing possible implementations of the first aspect, in a seventh possible implementation of the first aspect, the method further includes: sending, by the network device, second configuration information by using third signaling, where the second configuration information is used to configure a CSI-IM resource group associated with at least one of the N CSI-RS resources, or the second configuration information is used to configure a CSI-IM resource group associated with each of the N CSI-RS resources.

In a possible implementation, the third signaling is radio resource control RRC signaling or Media Access Control (Media Access Control, MAC) layer control element (control element, CE) signaling.

Specifically, configuring a CSI-IM resource group by using RRC signaling is applicable to a scenario in which configuration of the CSI-IM resource group does not frequently change and is relatively stable. In this way, bit overheads of physical layer signaling and MAC layer signaling can be greatly reduced, because only selection from the CSI-IM resource group that has been configured by using the RRC signaling is required for the physical layer signaling. Therefore, bit overheads of the physical layer signaling can be reduced by properly configuring a quantity of CSI-IM resource groups. However, configuring a CSI-IM resource group by using MAC CE signaling is applicable to a scenario in which configuration of the CSI-IM resource group changes relatively dynamically. The MAC CE signaling is decoded faster than the RRC signaling. Therefore, in this scenario, it is more efficient for the network device to configure a CSI-IM resource group by using the MAC CE signaling. It should be understood that because a relatively large quantity of bits are required to configure a CSI-IM resource group, using DCI signaling to configure the CSI-IM resource group is not considered, to avoid unsustainable bit overheads of the DCI signaling.

With reference to the foregoing possible implementations of the first aspect, in an eighth possible implementation of the first aspect, the $n_i$ of CSI-IM resource groups associated with the $i^{th}$ CSI-RS resource meets $1 \leq n_i \leq N_1$, where $N_1$ is an integer, and $2 \leq N_1 \leq N$; and the first indication information includes $\lceil \log_2 N \rceil + \lceil \log_2 N_1 \rceil$ bits, where the $\lceil \log_2 N \rceil$ bits are used to indicate the target CSI-RS resource, and the $\lceil \log_2 N_1 \rceil$ bits are used to indicate the target CSI-IM resource group. In this specification, $\lceil \alpha \rceil$ represents rounding up a real number $\alpha$.

Specifically, the quantity $n_i$ of CSI-IM resource groups associated with the $i^{th}$ CSI-RS resource meets $1 \leq n_i \leq N_1$. In other words, $N_1$ is a maximum value of a quantity of CSI-IM resource groups associated with each CSI-RS resource. The network device may indicate the target CSI-RS resource by using the $\lceil \log_2 N \rceil$ bits, and indicate the target CSI-IM resource group by using the $\lceil \log_2 N_1 \rceil$ bits.

It should be understood that in this embodiment of this application, a quantity of bits of the first indication information is fixed. The fixed bit quantity can reduce complexity of performing blind detection on the first signaling by the terminal device. Particularly, when the first signaling is DCI signaling, reducing the complexity of the blind detection by the terminal device can improve efficiency of detecting the first signaling by the terminal device, and help the terminal device detect the first signaling fast and perform channel measurement on a corresponding CSI-RS resource and a corresponding CSI-IM resource group based on the first signaling, thereby improving channel state measurement efficiency. In addition, reducing the complexity of the blind detection by the terminal device can further reduce power consumption of the terminal device in detecting the first signaling, and prolong a standby time of the terminal device.

With reference to the foregoing possible implementations of the first aspect, in a ninth possible implementation of the first aspect, before the sending, by the network device, first indication information by using first signaling, the method further includes: sending, by the network device, third configuration information by using fourth signaling, where the third configuration information is used to configure $N_1$.

In a possible implementation, the third signaling is radio resource control RRC signaling or Media Access Control layer control element MAC CE signaling.

It should be understood that in this embodiment of this application, the second signaling used to configure the N CSI-RS resources and the third signaling used to configure the CSI-IM resource group associated with each of the N CSI-RS resources may be same signaling or different signaling, and the second signaling and the fourth signaling used to configure $N_1$ may be same signaling or different signaling. This is not limited in this embodiment of this application.

With reference to the foregoing possible implementations of the first aspect, in a tenth possible implementation of the first aspect, $N_1$ is determined by the network device according to a predefined rule.

In a possible implementation, the predefined rule is $N_1=N$.

With reference to the foregoing possible implementations of the first aspect, in an eleventh possible implementation of the first aspect, the first signaling is downlink control information DCI.

It should be understood that a speed of decoding the DCI by the terminal device is relatively high. The network device notifies the first indication information by using the DCI, so that the terminal device can learn of the quantity of paired terminal devices of the terminal device in a timely manner, and obtain accurate configuration information of the target CSI-RS resource and the target CSI-IM resource group, to help the terminal device obtain a more accurate CQI.

According to a second aspect, another channel state measurement method is provided, including: receiving, by a terminal device, first signaling, where the first signaling carries first indication information, the first indication information is used to indicate a target channel state information-reference signal CSI-RS resource and a target channel state information-interference measurement CSI-IM resource group, the target CSI-IM resource group includes a CSI-RS resource in the N CSI-RS resources, an $i^{th}$ CSI-RS resource in the N CSI-RS resources is associated with $n_i$ CSI-IM resource groups, and a $k^{th}$ CSI-IM resource group in the $n_i$ CSI-IM resource groups includes $x_{ik}$ CSI-RS resources in the N CSI-RS resources except the $i^{th}$ CSI-RS resource, where N, i, $n_i$, k, and $x_{ik}$ are all integers, $N \geq 2$, $i=1, 2, \ldots, N$, $1 \leq n_i \leq N$, $k=1, 2, \ldots, n_i$, $0 \leq x_{ik} \leq N-1$, $j \in \{1, 2, \ldots, N\}$, and $n_j \geq 2$; and reporting, by the terminal device, a channel quality indicator CQI, where the CQI is determined based on a channel coefficient measured by the terminal device on the target CSI-RS resource and interference measured by the terminal device on the CSI-RS resource in the target CSI-IM resource group.

According to the channel state measurement method in this embodiment of this application, a CSI-IM resource group associated with each of the N CSI-RS resources is configured in a particular manner, and therefore a quantity of configured CSI-IM resource groups does not exceed the preset quantity N of CSI-RS resources while meeting a requirement for a dynamic change in a quantity of paired terminal devices. In this way, bit overheads used by a network device to select a CSI-IM resource can be reduced, and a payload size of signaling can be reduced, thereby improving system performance.

In a first possible implementation of the second aspect, in $n_j$ CSI-IM resource groups associated with a $j^{th}$ CSI-RS resource in the N CSI-RS resources, different CSI-IM resource groups include different quantities of CSI-RS resources.

With reference to the foregoing possible implementation of the second aspect, in a second possible implementation of the second aspect, identifiers of the N CSI-RS resources are 1, 2, ..., N and represent a CSI-RS resource 1, a CSI-RS resource 2, ..., and a CSI-RS resource N, and a set of identifiers of CSI-RS resources included in the $k^{th}$ CSI-IM resource group in the $n_i$ CSI-IM resource groups associated with the $i^{th}$ CSI-RS resource is:

$$\left\{ \left\lfloor \frac{i-1}{x_{ik}+1} \right\rfloor (x_{ik}+1)+1, \right.$$
$$\left. \left\lfloor \frac{i-1}{x_{ik}+1} \right\rfloor (x_{ik}+1)+2, \ldots, \left\lfloor \frac{i-1}{x_{ik}+1} \right\rfloor (x_{ik}+1)+x_{ik}+1 \right\} \Big/ \{i\},$$

where a set A/a set B represents a set of remaining elements in the set A after elements in the set B are removed from the set A.

With reference to the foregoing possible implementations of the second aspect, in another possible implementation of the second aspect, $x_{ik}=k-1$, and a set of identifiers of CSI-RS resources included in the $k^{th}$ CSI-IM resource group is:

$$\left\{ \left\lfloor \frac{i-1}{k} \right\rfloor k+1, \left\lfloor \frac{i-1}{k} \right\rfloor k+2, \ldots, \left\lfloor \frac{i-1}{k} \right\rfloor k+k \right\} \Big/ \{i\}.$$

With reference to the foregoing possible implementations of the second aspect, in another possible implementation of the second aspect, $x_{ik}=k$, and a set of identifiers of CSI-RS resources included in the $k^{th}$ CSI-IM resource group is:

$$\left\{ \left\lfloor \frac{i-1}{k+1} \right\rfloor (k+1)+1, \left\lfloor \frac{i-1}{k+1} \right\rfloor (k+1)+2, \ldots, \left\lfloor \frac{i-1}{k+1} \right\rfloor (k+1)+k+1 \right\} \Big/ \{i\}.$$

With reference to the foregoing possible implementations of the second aspect, in a third possible implementation of the second aspect, identifiers of the N CSI-RS resources are 1, 2, . . . , N and represent a CSI-RS resource 1, a CSI-RS resource 2, . . . , and a CSI-RS resource N, a quantity of CSI-IM resource groups associated with the $i^{th}$ CSI-RS resource is $n_i=N+1-i$, and a set of identifiers of CSI-RS resources included in the $k^{th}$ CSI-IM resource group is:

{1,2, . . . , i+k−1}/{i}, where a set A/a set B represents a set of remaining elements in the set A after elements in the set B are removed from the set A.

With reference to the foregoing possible implementations of the second aspect, in a fourth possible implementation of the second aspect, the N CSI-RS resources are non-zero power CSI-RS resources, and each CSI-IM resource group further includes a zero power CSI-RS resource. A non-zero power CSI-RS resource included in each CSI-IM resource group is used to measure first-type interference, and the zero power CSI-RS resource is used to measure second-type interference. The first-type interference includes multi-user interference, and the second-type interference includes inter-cell interference.

With reference to the foregoing possible implementations of the second aspect, in a fifth possible implementation of the second aspect, before the receiving, by a terminal device, first signaling, the method further includes:

receiving, by the terminal device, second signaling, where the second signaling carries first configuration information, and the first configuration information is used to configure the N CSI-RS resources.

With reference to the foregoing possible implementations of the second aspect, in a sixth possible implementation of the second aspect, the second signaling is radio resource control RRC signaling.

With reference to the foregoing possible implementations of the second aspect, in a seventh possible implementation of the second aspect, the method further includes: receiving, by the terminal device, third signaling, where the third signaling carries second configuration information, and the second configuration information is used to configure a CSI-IM resource group associated with at least one of the N CSI-RS resources, or the second configuration information is used to configure a CSI-IM resource group associated with each of the N CSI-RS resources.

With reference to the foregoing possible implementations of the second aspect, in an eighth possible implementation of the second aspect, the quantity $n_i$ of CSI-IM resource groups associated with the $i^{th}$ CSI-RS resource meets $1 \leq n_i \leq N_1$, where $N_1$ is an integer, and $2 \leq N_1 \leq N$; and the first indication information includes $\lceil \log_2 N \rceil + \lceil \log_2 N_1 \rceil$ bits, where the $\lceil \log_2 N \rceil$ bits are used to indicate the target CSI-RS resource, and the $\lceil \log_2 N_1 \rceil$ bits are used to indicate the target CSI-IM resource group.

With reference to the foregoing possible implementations of the second aspect, in a ninth possible implementation of the second aspect, before the receiving, by a terminal device, first signaling, the method further includes: receiving, by the terminal device, fourth signaling, where the fourth signaling carries third configuration information, and the third configuration information is used to configure $N_1$.

With reference to the foregoing possible implementations of the second aspect, in a tenth possible implementation of the second aspect, $N_1$ is determined by the terminal device according to a predefined rule.

In a possible implementation, the predefined rule is $N_1=N$.

With reference to the foregoing possible implementations of the second aspect, in an eleventh possible implementation of the second aspect, the first signaling is downlink control information DCI.

According to a third aspect, a channel state measurement apparatus is provided, and is configured to perform the method in any one of the first aspect or the possible implementations of the first aspect. Specifically, the apparatus includes a unit configured to perform the method in any one of the first aspect or the possible implementations of the first aspect.

According to a fourth aspect, a channel state measurement apparatus is provided, and is configured to perform the method in any one of the second aspect or the possible implementations of the second aspect. Specifically, the apparatus includes a unit configured to perform the method in any one of the second aspect or the possible implementations of the second aspect.

According to a fifth aspect, a channel state measurement apparatus is provided. The apparatus includes a transceiver, a memory, and a processor. The transceiver, the memory, and the processor communicate with each other through an internal connection channel. The memory is configured to store an instruction. The processor is configured to execute the instruction stored in the memory, to control a receiver to receive a signal and control a transmitter to send a signal. In addition, when the processor executes the instruction stored in the memory, the execution enables the processor to perform the method in any one of the first aspect or the possible implementations of the first aspect.

According to a sixth aspect, a channel state measurement apparatus is provided. The apparatus includes a transceiver, a memory, and a processor. The transceiver, the memory, and the processor communicate with each other through an internal connection channel. The memory is configured to store an instruction. The processor is configured to execute the instruction stored in the memory, to control a receiver to receive a signal and control a transmitter to send a signal. In addition, when the processor executes the instruction stored in the memory, the execution enables the processor to perform the method in any one of the second aspect or the possible implementations of the second aspect.

According to a seventh aspect, a channel state measurement system is provided, and the system includes the apparatus in any one of the third aspect or the possible implementations of the third aspect and the apparatus in any one of the fourth aspect or the possible implementations of the fourth aspect; or the system includes the apparatus in any one of the fifth aspect or the possible implementations of the fifth aspect and the apparatus in any one of the sixth aspect or the possible implementations of the sixth aspect.

According to an eighth aspect, a computer readable medium is provided, and is configured to store a computer program. The computer program includes an instruction used to perform the method in any one of the first aspect or the possible implementations of the first aspect.

According to a ninth aspect, a computer readable medium is provided, and is configured to store a computer program. The computer program includes an instruction used to perform the method in any one of the second aspect or the possible implementations of the second aspect.

DESCRIPTION OF EMBODIMENTS

The following describes the technical solutions in the embodiments of this application with reference to the accompanying drawings in the embodiments of this application.

The technical solutions in the embodiments of this application may be applied to various communications systems, such as a Global System for Mobile Communications (Global System for Mobile Communications, GSM), a Code Division Multiple Access (Code Division Multiple Access, CDMA) system, a Wideband Code Division Multiple Access (Wideband Code Division Multiple Access, WCDMA) system, a general packet radio service (general packet radio service, GPRS), a Long Term Evolution (Long Term Evolution, LTE) system, an LTE frequency division duplex (frequency division duplex, FDD) system, an LTE time division duplex (time division duplex, TDD) system, a Universal Mobile Telecommunications System (Universal Mobile Telecommunications System UMTS), a Worldwide Interoperability for Microwave Access (Worldwide Interoperability for Microwave Access, WiMAX) communications system, and a future 5G system.

Figure 1:
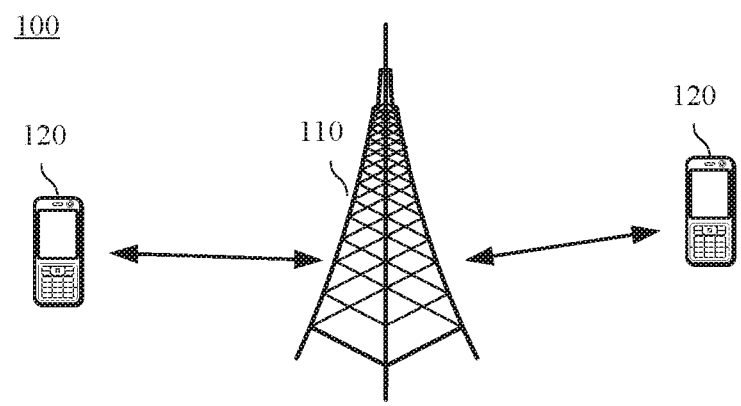
FIG. 1 is a schematic diagram of a communications system according to an embodiment of this application.

FIG. 1 shows a communications system 100 to which an embodiment of this application is applied. The communications system 100 may include at least one network device 110. The network device 100 may be a device that communicates with a terminal device, for example, a base station or a base station controller. Each network device 100 may provide communication coverage for a particular geographic area, and may communicate with a terminal device (for example, UE) located in the coverage area (a cell). The network device 100 may be a base transceiver station (base transceiver station, BTS) in a GSM system or a Code Division Multiple Access (Code Division Multiple Access, CDMA) system, or a NodeB (NodeB, NB) in a WCDMA system, or an evolved NodeB (evolved NodeB, eNB, or eNodeB) in an LTE system, or a radio controller in a cloud radio access network (cloud radio access network, CRAN). Alternatively, the network device may be a relay station, an access point, an in-vehicle device, a wearable device, a network-side device in a future 5G network, a network device in a future evolved public land mobile network (public land mobile network, PLMN), or the like.

The wireless communications system 100 further includes a plurality of terminal devices 120 within a coverage range of the network device 110. The terminal device 120 may be mobile or fixed. The terminal device 120 may be an access terminal, user equipment (user equipment, UE), a subscriber unit, a subscriber station, a mobile station, a mobile console, a remote station, a remote terminal, a mobile device, a user terminal, a terminal, a wireless communications device, a user agent, a user apparatus, or the like. The access terminal may be a cellular phone, a cordless phone, a Session Initiation Protocol (Session Initiation Protocol, SIP) phone, a wireless local loop (wireless local loop, WLL) station, a personal digital assistant (personal digital assistant, PDA), a handheld device having a wireless communication function, a computing device, another processing device connected to a wireless modem, an in-vehicle device, a wearable device, a terminal device in a future 5G network, a terminal device in a future evolved public land mobile network (public land mobile network, PLMN), or the like.

FIG. 1 shows one network device and two terminal devices as an example. Optionally, the communications system 100 may include a plurality of network devices, and another quantity of terminal devices may be included in a coverage range of each network device. This is not limited in this embodiment of this application.

Optionally, the wireless communications system 100 may further include another network entity such as a network controller or a mobility management entity. This is not limited in this embodiment of this application.

The following first describes a channel quality indicator (channel quality indicator, CQI), a channel state information-reference signal (channel state information-reference signal, CSI-RS) resource, and a channel state information-interference measurement (CSI interference measurement, CSI-IM) resource in the embodiments of this application.

CQI: Channel quality indicator, which indicates current channel quality and is obtained after being measured and reported by a terminal device. A CQI of a given channel can be used by a network device to determine a proper modulation and coding scheme (modulation and channel coding scheme, MCS).

Data transmission performance can be improved by using a proper MCS. Therefore, if a CQI fed back by the terminal device can relatively accurately reflect a real signal to interference plus noise ratio at which the terminal device receives downlink data when the network device sends the downlink data to the terminal device, the network device can determine a proper MCS based on the CQI.

In a multiple-input multiple-output (multiple-input multiple-output, MIMO) system, a network device may simultaneously transmit data to a plurality of terminal devices on a same time-frequency resource. In this specification, when a same network device transmits data to a terminal device on a configured time-frequency resource, another terminal device that simultaneously performs data transmission with the network device on the same time-frequency resource is referred to as a paired terminal device of the terminal device. Data received by this terminal device is interfered with by data sent by the network device to the paired terminal device of this terminal device, and such interference is referred to as multi-user interference in this specification. In addition, when a network device of another cell transmits data to a terminal device served by the network device of the another cell, interference to this terminal device is also caused, and such interference is referred to as inter-cell interference. Therefore, when measuring a CQI, in addition to a channel coefficient of a channel from the network device to the terminal device, the terminal device needs to consider the multi-user interference caused by the paired terminal device of the terminal device and inter-cell interference caused when another network device transmits data to another terminal device.

The same network device may be a transmission and reception point (transmission and reception point, TRP), or may be a plurality of TRPs in a joint transmission (joint transmission, JT) mode. This is not limited in this embodiment of this application.

Therefore, for a particular terminal device, the network device not only needs to configure, for the terminal device, a reference signal resource used to measure a channel coefficient, but also needs to configure, for the terminal device, a reference signal resource used to measure interference. The reference signal resource used to measure a channel coefficient may be a CSI-RS resource, and the reference signal resource used to measure interference may be referred to as a CSI-IM resource, or may have another name, for example, an IM resource. This is not limited in this embodiment of this application. In this specification, a CSI-IM resource is used to represent a reference signal resource used by a terminal device to measure interference. The CSI-IM resource may be a non-zero power CSI-RS resource, or may be a zero power CSI-RS resource, or may be a reference signal resource of another type, for example, a demodulation reference signal (demodulation reference signal, DMRS). In addition, the CSI-IM resource may be used to measure multi-user interference or inter-cell interference, or both multi-user interference and inter-cell interference. It should be understood that a CSI-RS resource and a CSI-IM resource of a terminal device are different time-frequency-code resources.

CSI-RS resource: Reference signal resource used to measure a channel coefficient of a channel from the network device to the terminal device and obtain channel state information (channel state information). The network device may send a CSI-RS on a CSI-RS resource configured for the terminal device. The terminal device measures the channel between the network device and the terminal device by measuring the CSI-RS. The terminal device may report a CQI based on a measurement result.

CSI-IM resource: Time-frequency-code resource for measuring interference and obtaining interference information, which may be a reference signal resource or may be a resource of another type, for example, a downlink shared channel (physical downlink shared channel, PDSCH) resource. In this specification, the CSI-IM resource is a reference signal resource. For example, the CSI-IM resource may be a non-zero power CSI-RS resource or a zero power CSI-RS resource. If the CSI-IM resource is a non-zero power CSI-RS resource, the network device sends, on the CSI-IM resource, a CSI-RS whose power is greater than 0, and the terminal device may measure, on the CSI-IM resource, information about multi-user interference caused by a paired terminal device (for example, amid-user interference power, a channel coefficient of an interference channel, or a sum of multi-user interference power and inter-cell interference power). If the CSI-IM resource is a zero power CSI-RS resource, the network device does not send any signal on the CSI-IM resource, or sends a CSI-RS whose power is equal to zero, and the terminal device may measure inter-cell interference on the CSI-IM resource and obtain interference information. The terminal device obtains more comprehensive channel state information based on the measured interference information and a channel measurement result on the CSI-RS resource, and reports a more accurate CQI.

In an actual system, at different moments, a paired terminal device of a terminal device may dynamically change, and a quantity of paired terminal devices of the terminal device may also dynamically change. To enable the terminal device to report a more accurate CQI, the network device needs to dynamically select one or more CSI-IM resources (non-zero power CSI-RS resources) by using signaling, to match a paired terminal device of the terminal device at a current transmission moment, so that the terminal device accurately measures multi-user interference caused by the paired terminal device at the current transmission moment. To improve resource utilization, usually, the network device configures N CSI-RS resources for the terminal device by using higher layer signaling (such as RRC signaling or MAC CE signaling). The N CSI-RS resources are shared by a plurality of terminal devices served by the network device, and not only may be used by the terminal device to measure a channel coefficient, but also may be used by the terminal device to measure multi-user interference and/or inter-cell interference. In other words, a CSI-IM resource (usually a non-zero power CSI-RS resource) used by a terminal device to measure multi-user interference is a CSI-RS resource of a paired terminal device of the terminal device. In other words, a reference signal resource used by the terminal device to measure interference is the same as a reference signal resource used by the paired terminal device of the terminal device to measure a channel coefficient.

For example, UE 1 and UE 2 are mutually paired terminal devices, and the network device simultaneously sends CSI-RSs on a CSI-RS resource of the UE 1 and a CSI-RS resource of the UE 2. The UE I may obtain, by measuring the CSI-RS resource of the UE 2, interference caused by the UE 2 to the UE 1 (in other words, the CSI-RS resource of the UE 2 is used as a CSI-IM resource of the UE 1). The UE 2 may obtain, by measuring the CSI-RS resource of the UE 1, interference caused by the UE 1 to the UE 2 (in other words, the CSI-RS resource of the UE 1 is used as a CSI-IM resource of the UE 2), The network device may simultaneously transmit data to a plurality of terminal devices. Because processes of data transmission between the network device and the terminal devices are similar, for ease of understanding and description, the following describes the embodiments of this application from a perspective of any terminal device that performs data transmission with the network device.

Figure 2:
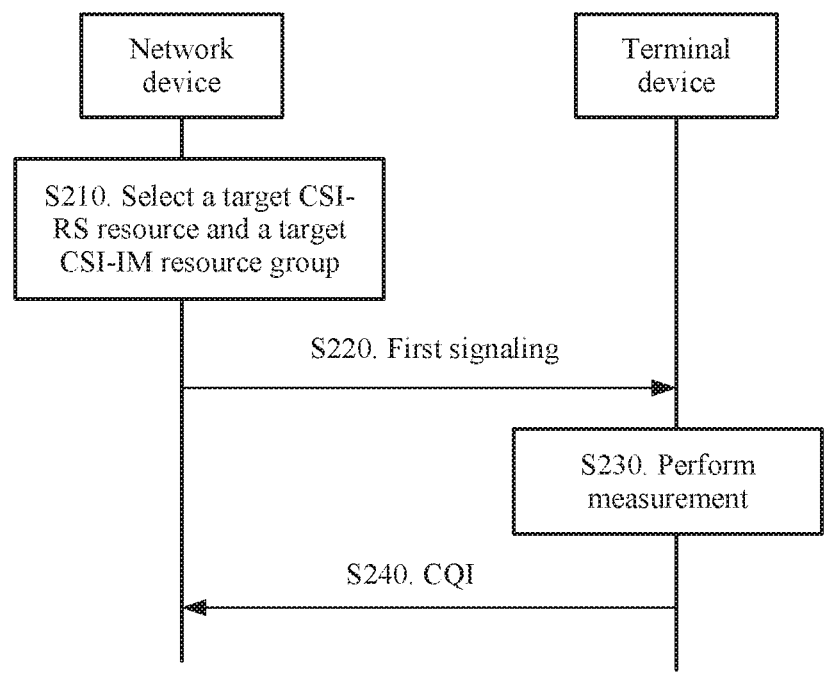
FIG. 2 is a schematic flowchart of a channel state measurement method according to an embodiment of this application.

FIG. 2 is a schematic flowchart of a channel state measurement method 200 according to an embodiment of this application. The method 200 may be applied to the communications system 100 shown in FIG. 1. However, this is not limited in this embodiment of this application.

S210. A network device selects, from N channel state information-reference signal CSI-RS resources, a target CSI-RS resource and a target channel state information-interference measurement CSI-IM resource group associated with the target CSI-RS resource, where the target CSI-IM resource group includes a CSI-RS resource in the N CSI-RS resources, an $i^{th}$ CSI-RS resource in the N CSI-RS resources is associated with $n_i$ CSI-IM resource groups, and a $k^{th}$ CSI-IM resource group in the $n_i$ CSI-IM resource groups includes $x_{ik}$ CSI-RS resources in the N CSI-RS resources except the $i^{th}$ CSI-RS resource, where N, i, $n_i$, k, and $x_{ik}$ are all integers, N≥2, i=1, 2, . . . , N, 1≤$n_i$≤N, k=1, 2, . . . , $n_i$, 0≤$x_{ik}$≤N−1, j∈{1, 2, . . . , N}, and $n_j$≥2.

It should be understood that "the target CSI-IM resource group includes a CSI-RS resource in the N CSI-RS resources" means that the CSI-RS resource in the target CSI-IM resource group is selected from the N CSI-RS resources.

S220. The network device sends first indication information by using first signaling, where the first indication information is used to indicate the target CSI-RS resource and the target CSI-IM resource group; and correspondingly, the terminal device receives the first signaling to obtain the first indication information.

S230. The terminal device measures a channel coefficient according to the first indication information by using the target CSI-RS resource, and measures interference by using the CSI-RS resource in the target CSI-IM resource group, to obtain a channel quality indicator CQI.

S240. The terminal device reports the channel quality indicator CQI.

Correspondingly, the network device may receive the CQI reported by the terminal device, and further, the network device may determine an MCS used for to-be-sent data. This is not limited in this embodiment of this application.

Specifically, the network device may configure the N CSI-RS resources for the terminal device by using higher layer signaling (such as RRC signaling or MAC CE signaling). Each of the N CSI-RS resources is associated with a specific quantity of CSI-IM resource groups, or at least one of the N CSI-RS resources is associated with a specific quantity of CSI-IM resource groups, and there is at least one CSI-RS resource associated with two or more CSI-IM resource groups. It should be understood that the N CSI-RS resources may be shared by at least one terminal device served by the network device. For a particular terminal device, the network device may select one of the N CSI-RS resources as a CSI-RS resource for measuring a channel coefficient by the terminal device, and the network device may also select a part of the N CSI-RS resources as a CSI-IM resource for measuring interference by the terminal device. Therefore, a CSI-RS resource in the foregoing CSI-IM resource group may be a part of the N CSI-RS resources (or may be zero). In this way, the network device may select one of the N CSI-RS resources for the terminal device as the target CSI-RS resource, and select one CSI-IM resource group associated with the target CSI-RS resource as the target CSI-IM resource group.

An implementation of associating one CSI-IM resource group with one CSI-RS resource is as follows: Configuration information of the CSI-RS resource includes a CSI-IM field or another similar field (for example, a CSI-IM resource group or a CSI-IM group). When configuring one CSI-RS resource for the terminal device by using signaling (such as RRC signaling or MAC CE signaling), the network device may write, into a CSI-IM field of the CSI-RS resource by using the signaling, an identifier of each CSI-IM resource group configured for the CSI-RS resource and an identifier of a CSI-RS resource included in the CSI-IM resource group corresponding to the identifier of each CSI-IM resource group. In this way, one CSI-IM resource group is associated with one CSI-RS resource.

Another implementation of associating one CSI-IM resource group with one CSI-RS resource is as follows: A wireless standard protocol defines a CSI-IM field or another similar field (for example, a CSI-IM resource group or a CSI-IM group) in configuration information of the CSI-RS resource, and defines, in configuration information of the CSI-IM resource group, an identifier of the CSI-IM resource group and an identifier of a CSI-RS resource included in the CSI-IM resource group or a similar field. In a process in which the network device communicates with the terminal device, when the network device configures a CSI-IM resource group for the terminal device by using signaling (such as RRC signaling or MAC CE signaling), the network device may configure, by using the signaling, parameters such as an identifier of each CSI-IM resource group and an identifier of a CSI-RS resource included in each CSI-IM resource group. In addition, the network device may further configure a CSI-RS resource by using signaling (such as RRC signaling or MAC CE signaling), to be specific, write, into a CSI-IM field of the CSI-RS resource by using the signaling, an identifier of a CSI-IM resource group configured for the CSI-RS resource. In this way, by using a CSI-IM field in configuration information of each CSI-RS resource, the terminal device may learn of an identifier of a CSI-IM resource group configured for the CSI-RS resource. Further, by using configuration information of each CSI-IM resource group, the terminal device may learn of a CSI-RS resource included in the CSI-IM resource group configured for the CSI-RS resource. In this way, one CSI-IM resource group is associated with one CSI-RS resource.

It should be understood that the foregoing implementation of associating one CSI-IM resource group with one CSI-RS resource is only an example for description. The network device may associate one CSI-IM resource group with one CSI-RS resource by using another method. This is not limited in this embodiment of this application.

It should be understood that the target CSI-RS resource is used by the terminal device to measure a channel coefficient, and the CSI-RS resource in the target CSI-IM resource group is used by the terminal device to measure interference. In this embodiment of this application, a CSI-IM resource group only functionally represents a part of CSI-RS resources used to measure interference. The CSI-IM resource group may also be referred to as a CSI-IM resource set, a first resource set, a first resource group, or the like. Alternatively, a CSI-IM resource group may be directly referred to as a CSI-IM resource, and the CSI-IM resource includes one or more CSI-RS resources. This is not limited in this embodiment of this application.

The network device sends, to the terminal device by using the first signaling, the first indication information used to indicate the target CSI-RS resource and the target CSI-IM resource group. According to the indication from the network device, the terminal device measures the channel coefficient by using the target CSI-RS resource and measures the interference by using the CSI-RS resource in the target CSI-IM resource group, to finally obtain the CQI and report the CQI to the network device.

In a solution in which a CSI-RS resource used for interference measurement is indicated by using a bitmap bitmap, the network device indicates, to a terminal device by using a bitmap bitmap, a CSI-RS resource used for interference measurement in the N CSI-RS resources that are configured by the network device for the terminal device by using higher layer signaling (such as RRC signaling or MAC CE signaling). The CSI-RS resource used for interference measurement may be functionally referred to as a CSI-IM resource. The network device indicates, by using N bits, the CSI-IM resource configured for this terminal device for interference measurement, where an $i^{th}$ bit indicates whether the $i^{th}$ CSI-RS resource is configured for the terminal device for interference measurement, and i=1, 2, . . . , N. For example, 0 is used to indicate that the CSI-RS resource is not configured for the terminal device as a CSI-IM resource, and 1 is used to indicate that the CSI-RS resource is configured for the terminal device as a CSI-IM resource. In this manner, the bitmap requires at least N bits. In a next-generation wireless communications system, the network device may simultaneously transmit a maximum of 8 or 12 data streams on a same time-frequency resource, and therefore may simultaneously serve 8 or 12 terminal devices. Therefore, the N CSI-RS resources are at least 8 or 12 CSI-RS resources, and at least 8 or 12 bits need to be reserved in a bitmap of a CSI-IM resource that needs to be indicated by the network device to the terminal device. This causes excessively high bit overheads of DCI.

In this embodiment of this application, the N CSI-RS resources are pre-configured, and each of CSI-IM resource groups associated with at least one of the N CSI-RS resources includes a specific quantity of CSI-RS resources, which are used by the terminal device to measure interference. In addition, a quantity of configured CSI-IM resource groups does not exceed N while meeting a requirement for a dynamic change in a quantity of paired terminal devices. It should be understood that the network device and the terminal device may determine the foregoing association relationship between a CSI-RS resource and a CSI-IM resource group in a plurality of manners. For example, the network device may configure, for the terminal device by using signaling (such as RRC signaling or MAC CE signaling), a CSI-IM resource group associated with the at least one of the N CSI-RS resources. For another example, the network device and the terminal device may directly determine, according to a protocol agreement, a CSI-IM resource group associated with the at least one CSI-RS resource. This is not limited in this embodiment of this application. In this manner, for the network device, selecting one or more CSI-IM resources means selecting one CSI-IM resource group. Because a quantity of CSI-IM resource groups associated with the at least one CSI-RS resource does not exceed N, the network device allocates one bit to each of the N CSI-RS resources without a need to use a bitmap.

Optionally, in this embodiment of this application, the N CSI-RS resources are pre-configured, and each of CSI-IM resource groups associated with each of the N CSI-RS resources includes a specific quantity of CSI-RS resources, which are used by the terminal device to measure interference. In addition, a quantity of configured CSI-IM resource groups does not exceed N while meeting a requirement for a dynamic change in a quantity of paired terminal devices. It should be understood that the network device and the terminal device may determine the foregoing association relationship between a CSI-RS resource and a CSI-IM resource group in a plurality of manners. For example, the network device may configure, for the terminal device by using signaling (such as RRC signaling or MAC CE signaling), a CSI-IM resource group associated with each of the N CSI-RS resources. For another example, the network device and the terminal device may directly determine, according to a protocol agreement, a CSI-IM resource group associated with each CSI-RS resource. This is not limited in this embodiment of this application. In this manner, for the network device, selecting one or more CSI-IM resources means selecting one CSI-IM resource group. Because a quantity of CSI-IM resource groups associated with each CSI-RS resource does not exceed N, the network device allocates one bit to each of the N CSI-RS resources without a need to use a bitmap.

Therefore, according to the method for measuring a channel state and obtaining channel state information in this embodiment of this application, a CSI-IM resource group associated with each of the N CSI-RS resources is configured in a particular manner, and therefore a quantity of configured CSI-IM resource groups does not exceed the preset quantity N of CSI-RS resources while meeting the requirement for the dynamic change in the quantity of paired terminal devices. In this way, bit overheads of signaling used by the network device to select a CSI-IM resource can be reduced, and a payload size of the signaling can be reduced, thereby improving system performance.

It should be understood that in the foregoing method 200, signaling transmission between the network device and the terminal device may be direct transmission, or may be indirect transmission, namely, transmission using a relay device. Therefore, this embodiment of this application may be further applied to an application scenario in which a relay device exists or an application scenario of device-to-device (device-to-device, D2D) communication. This is not limited in this embodiment of this application.

In an optional embodiment, in $n_j$ CSI-IM resource groups associated with a $j^{th}$ CSI-RS resource in the N CSI-RS resources, different CSI-IM resource groups include different quantities of CSI-RS resources.

Specifically, interference measured by using a CSI-IM resource group is usually multi-user interference caused by a paired terminal device, one CSI-RS resource in the CSI-IM resource group is used to measure interference caused only by one paired terminal device, and a quantity of CSI-RS resources in a CSI-IM resource group configured by the network device for the terminal device is equal to a quantity of paired terminal devices of the terminal device. However, a quantity of paired terminal devices of a terminal device may vary at different moments. Therefore, in this embodiment of this application, if at least two CSI-IM resource groups are associated with a CSI-RS resource, different CSI-IM resource groups in the at least two CSI-IM resource groups include different quantities of CSI-RS resources. In this way, the network device may select different CSI-IM resource groups to meet a requirement for a change in a quantity of paired terminal devices, so that a CQI measured by the terminal device is more accurate.

It should be understood that a quantity of CSI-RS resources included in a CSI-IM resource group may directly or indirectly represent a quantity of paired terminal devices. For example, if all CSI-RS resources included in a CSI-IM resource group are non-zero power CSI-RS resources, a quantity of CSI-RS resources included in the CSI-IM resource group is equal to a quantity of pieces of measurable multi-user interference. In other words, the quantity of CSI-RS resources is equal to the quantity of paired terminal devices of the terminal device. If a CSI-IM resource group includes a zero power CSI-RS resource in addition to a non-zero CSI-RS resource, a quantity of non-zero CSI-RS resources included in the CSI-IM resource group is equal to a quantity of pieces of measurable multi-user interference. In other words, the quantity of non-zero CSI-RS resources is equal to the quantity of paired terminal devices of the terminal device. In this way, the network device may select, as the target CSI-IM resource group based on a quantity of paired terminal devices of the terminal device at a current moment, a CSI-IM resource group in which a quantity of included non-zero power CSI-RS resources is equal to the quantity of paired terminal devices.

It should be further understood that the network device may select the target CSI-RS resource and the target CSI-IM resource group in a plurality of manners. Specifically, the network device may first select the target CSI-RS resource, and then select, based on the quantity of paired terminal devices, the target CSI-IM resource group from CSI-IM resource groups associated with the target CSI-RS resource. Alternatively, the network device may first select a plurality of CSI-IM resource groups based on the quantity of paired terminal devices, where the plurality of CSI-IM resource groups are associated with different CSI-RS resources, and then the network device selects the target CSI-RS resource from the CSI-RS resources associated with the plurality of CSI-IM resource groups. Alternatively, the network device may separately select the target CSI-RS resource and the target CSI-IM resource group. Therefore, a process of selecting the target CSI-RS resource and the target CSI-IM resource group is not limited in this embodiment of this application.

In an optional embodiment, identifiers of the N CSI-RS resources are $1, 2, \ldots, N$ and represent a CSI-RS resource 1, a CSI-RS resource 2, and a CSI-RS resource N, and a set of identifiers of CSI-RS resources included in the $k^{th}$ ($k=1, \ldots, n_i$) CSI-IM resource group in the $n_i$ CSI-IM resource groups associated with the CSI-RS resource is:

$$\left\{\left\lfloor \frac{i-1}{x_{ik}+1} \right\rfloor (x_{ik}+1)+1, \left\lfloor \frac{i-1}{x_{ik}+1} \right\rfloor (x_{ik}+1)+2, \ldots, \left\lfloor \frac{i-1}{x_{ik}+1} \right\rfloor (x_{ik}+1)+x_{ik}+1\right\}/\{i\},$$

where a set A/a set B represents a set of remaining elements in the set A after elements in the set B are removed from the set A.

Specifically, it may be assumed that the identifiers allocated to the N CSI-RS resources are $1, 2, \ldots, N$, and the N CSI-RS resources are respectively referred to as the CSI-RS resource 1, the CSI-RS resource 2, and the CSI-RS resource N. In this embodiment of this application, the $k^{th}$ CSI-IM resource group associated with the $i^{th}$ CSI-RS resource includes $x_{ik}$ CSI-RS resources whose resource identifiers are consecutive, where $i=1, 2, \ldots, N$. As limited in the foregoing formula, identifiers of CSI-RS resources in a CSI-IM resource group are consecutive. In addition, different CSI-IM resource groups associated with a CSI-RS resource include different quantities of CSI-RS resources, so that a quantity of CSI-IM resource groups associated with a CSI-RS resource can be reduced, and a requirement for a change in a quantity of paired terminal devices can be met. Therefore, on a basis of meeting a measurement requirement of the terminal device, a quantity of bits required by the network device to select the target CSI-IM resource group is reduced, and bit overheads of signaling are reduced.

In an optional embodiment, $x_{ik}=k-1$, and a set of identifiers of CSI-RS resources included in the $k^{th}$ CSI-IM resource group is:

$$\left\{\left\lfloor \frac{i-1}{k} \right\rfloor k+1, \left\lfloor \frac{i-1}{k} \right\rfloor k+2, \ldots, \left\lfloor \frac{i-1}{k} \right\rfloor k+k\right\}/\{i\}.$$

In an optional embodiment, $x_{ik}=k$, and a set of identifiers of CSI-RS resources included in the $k^{th}$ CSI-IM resource group is:

$$\left\{\left\lfloor \frac{i-1}{k+1} \right\rfloor (k+1)+1, \left\lfloor \frac{i-1}{k+1} \right\rfloor (k+1)+2, \ldots, \left\lfloor \frac{i-1}{k+1} \right\rfloor (k+1)+k+1\right\}/\{i\}.$$

In an optional embodiment, identifiers of the N CSI-RS resources are $1, 2, \ldots, N$ and represent a CSI-RS resource 1, a CSI-RS resource 2, ..., and a CSI-RS resource N, a quantity of CSI-IM resource groups associated with the $i^{th}$ CSI-RS resource is $n_i=N+1-i$, and a set of identifiers of CSI-RS resources included in the $k^{th}$ CSI-IM resource group is:

$$\{1, 2, \ldots, i+k-1\}/\{i\}, \text{ where}$$

a set A/a set B represents a set of remaining elements in the set A after elements in the set B are removed from the set A.

Specifically, the identifiers $1, 2, \ldots, N$ may be allocated to the N CSI-RS resources, and the N CSI-RS resources are respectively referred to as the CSI-RS resource 1, the CSI-RS resource 2, ..., and the CSI-RS resource N. In this embodiment of this application, it is assumed that $n_i=N+1-i$. In this case, a quantity of CSI-IM resource groups associated with the CSI-RS resource 1 is N, a quantity of resource groups associated with the CSI-RS resource 2 is N-1, and by analogy, a quantity of CSI-IM resource groups associated with the CSI-RS resource N is 1. The set of identifiers of the CSI-RS resources included in the $k^{th}$ CSI-IM resource group associated with the $i^{th}$ CSI-RS resource is $\{1, 2, \ldots, i+k-1\}/\{i\}$. For example, in the N CSI-IM resource groups associated with the CSI-RS resource 1, a set of CSI-RS resources included in a first CSI-IM resource group is an empty set, a set of CSI-RS resources included in a second CSI-IM resource group is $\{2\}$, and by analogy, a set of CSI-RS resources included in an $N^{th}$ CSI-IM resource group is $\{2, 3, \ldots, N\}$.

As limited in the foregoing formula, identifiers of CSI-RS resources in a CSI-IM resource group are consecutive. In addition, the identifiers of the CSI-RS resources in the CSI-IM resource group are configured from a minimum value that can be used among $1, 2, \ldots, N$. In this way, a quantity of CSI-IM resource groups associated with a CSI-RS resource can be further reduced, so that bit overheads of signaling used by the network device to select the target CSI-IM resource group are reduced.

It should be understood that identifiers of the N CSI-RS resources may alternatively be $0, 1, \ldots, N-1$ and represent a CSI-RS resource 0, a CSI-RS resource 1, $\ldots$, and a CSI-RS resource N−1, and a set of identifiers of CSI-RS resources included in the $k^{th}$ ($k=1, \ldots, n_i$) CSI-IM resource group in the $n_i$ CSI-IM resource groups associated with the $i^{th}$ CSI-RS resource is:

$$\left\{ \left\lfloor \frac{i}{x_{ik}+1} \right\rfloor (x_{ik}+1), \left\lfloor \frac{i}{x_{ik}+1} \right\rfloor (x_{ik}+1)+1, \ldots, \left\lfloor \frac{i}{x_{ik}+1} \right\rfloor (x_{ik}+1)+x_{ik} \right\}/\{i\}.$$

Specifically, it may be assumed that the identifiers allocated to the N CSI-RS resources are $0, 1, \ldots, N-1$, and the N CSI-RS resources are respectively referred to as the CSI-RS resource 0, the CSI-RS resource 1, $\ldots$, and the CSI-RS resource N−1. In this embodiment of this application, the $k^{th}$ CSI-IM resource group associated with the $i^{th}$ CSI-RS resource includes $x_{ik}$ CSI-RS resources whose resource identifiers are consecutive, where $i=0, 1, \ldots$, and N−1. As limited in the foregoing formula, identifiers of CSI-RS resources in a CSI-IM resource group are consecutive. In addition, different CSI-IM resource groups associated with a CSI-RS resource include different quantities of CSI-RS resources, so that a quantity of CSI-IM resource groups associated with a CSI-RS resource can be reduced, and a requirement for a change in a quantity of paired terminal devices can be met. Therefore, on a basis of meeting a measurement requirement of the terminal device, a quantity of bits required by the network device to select the target CSI-IM resource group is reduced, and bit overheads of signaling are reduced.

In an optional embodiment, $x_{ik}=k-1$, and a set of identifiers of CSI-RS resources included in the $k^{th}$ CSI-IM resource group is:

$$\left\{ \left\lfloor \frac{i}{k} \right\rfloor k, \left\lfloor \frac{i}{k} \right\rfloor k+1, \ldots, \left\lfloor \frac{i}{k} \right\rfloor k+k-1 \right\}/\{i\}.$$

In an optional embodiment, $x_{ik}=k$, and a set of identifiers of CSI-RS resources included in the $k^{th}$ CSI-IM resource group is:

$$\left\{ \left\lfloor \frac{i}{k+1} \right\rfloor (k+1)+1, \left\lfloor \frac{i}{k+1} \right\rfloor (k+1)+2, \ldots, \left\lfloor \frac{i}{k+1} \right\rfloor (k+1)+k+1 \right\}/\{i\}.$$

In an optional embodiment, identifiers of the N CSI-RS resources are $0, 1, \ldots, N-1$, the N CSI-RS resources are respectively referred to as a CSI-RS resource 0, a CSI-RS resource 1, $\ldots$, and a CSI-RS resource N−1, a quantity of CSI-IM resource groups associated with the $i^{th}$ CSI-RS resource is $n_i = N - i$, and a set of identifiers of CSI-RS resources included in the $k^{th}$ ($k=1, \ldots, n_i$) CSI-IM resource group is:

$\{0, 1, 2, \ldots, i+k-1\}/\{i\}$, where a set A/a set B represents a set of remaining elements in the set A after elements in the set B are removed from the set A.

Specifically, the identifiers $0, 1, \ldots, N-1$ may be allocated to the N CSI-RS resources, and the N CSI-RS resources are respectively referred to as the CSI-RS resource 0, the CSI-RS resource 1, $\ldots$, and the CSI-RS resource N−1. In this embodiment of this application, it is assumed that $n_i = N - i$. In this case, a quantity of CSI-IM resource groups associated with the CSI-RS resource 0 is N, a quantity of resource groups associated with the CSI-RS resource 2 is N−1, and by analogy, a quantity of CSI-IM resource groups associated with the CSI-RS resource N−1 is 1. The set of identifiers of the CSI-RS resources included in the $k^{th}$ CSI-IM resource group associated with the $i^{th}$ CSI-RS resource is $\{0, 1, 2, \ldots, i+k-1\}/\{i\}$. For example, in the N CSI-IM resource groups associated with the CSI-RS resource 0, a set of CSI-RS resources included in a first CSI-IM resource group is an empty set, a set of CSI-RS resources included in a second CSI-IM resource group is $\{1\}$, and by analogy, a set of CSI-RS resources included in an $N^{th}$ CSI-IM resource group is $\{1, 2, \ldots, N-1\}$.

As limited in the foregoing formula, identifiers of CSI-RS resources in a CSI-IM resource group are consecutive. In addition, the identifiers of the CSI-RS resources in the CSI-IM resource group are configured from a minimum value that can be used among $0, 1, \ldots, N-1$. In this way, a quantity of CSI-IM resource groups associated with a CSI-RS resource can be further reduced, so that overheads of signaling used by the network device to select the target CSI-IM resource group are reduced.

In an optional embodiment, the N CSI-RS resources are non-zero power CSI-RS resources, and each CSI-IM resource group further includes a zero power CSI-RS resource. A non-zero power CSI-RS resource included in each CSI-IM resource group is used to measure first-type interference, and the zero power CSI-RS resource is used to measure second-type interference. The first-type interference includes multi-user interference, and the second-type interference includes inter-cell interference.

Specifically, all the N CSI-RS resources are non-zero power CSI-RS resources and are used to measure first-type interference. Optionally, a zero power CSI-RS resource may be further configured for the terminal device and is used to measure second-type interference. It should be understood that the first-type interference usually includes multi-user interference, and the second-type interference usually includes inter-cell interference. Therefore, it should be understood that the network device does not send any reference signal on the zero power CSI-RS resource, and the zero power CSI-RS resource is merely used by the network device to measure inter-cell interference. When the network device configures a zero power CSI-RS resource, each CSI-IM resource group includes the zero power CSI-RS resource. However, this is not limited in this embodiment of this application.

In an optional embodiment, before the network device selects, from the N channel state information-reference signal CSI-RS resources, the target CSI-RS resource and the target channel state information-interference measurement CSI-IM resource group associated with the target CSI-RS resource, the method further includes:

the network device sends first configuration information by using second signaling, where the first configuration information is used to configure the N CSI-RS resources.

Specifically, the network device may configure the N CSI-RS resources for the terminal device by using signaling. Configuration information of a CSI-RS resource includes a plurality of pieces of information, for example, an identifier of the CSI-RS resource, a quantity of ports of the CSI-RS resource, and a time-frequency resource occupied by the CSI-RS resource. It should be understood that the configuration information may further include other information. This is not limited in this embodiment of this application.

It should be understood that a set of the N CSI-RS resources configured by the network device may also be referred to as a CSI-RS resource pool. However, this is not limited in this embodiment of this application.

In an optional embodiment, e second signaling is radio resource control (radio resource control, RRC) signaling.

Specifically, because a CSI-RS resource remains unchanged in a short time once being configured, the network device may configure the N CSI-RS resources by using higher layer signaling. Configuration information of a CSI-RS resource includes a plurality of parameters. Therefore, overheads of dynamic signaling (for example, physical layer downlink control information DCI) can be greatly reduced by configuring the N CSI-RS resources by using the higher layer signaling, because only selection of a CSI-RS resource from the configured N CSI-RS resources is required for the dynamic signaling. In an implementation, the higher layer signaling is radio resource control RRC signaling.

After the network device configures the N CSI-RS resources, the network device and the terminal device may determine, in a plurality of manners, an association relationship between a CSI-RS resource in the N CSI-RS resources and a CSI-IM resource group. Specifically, the network device and the terminal device may separately determine, according to a predefined rule, a CSI-IM resource group associated with at least one CSI-RS resource, or the network device may configure, for the terminal device by using signaling, a CSI-IM resource group associated with at least one CSI-RS resource. This is not limited in this embodiment of this application. Specifically, the network device and the terminal device may separately determine, according to a predefined rule, a CSI-IM resource group associated with each CSI-RS resource, or the network device may configure, for the terminal device by using signaling, a CSI-IM resource group associated with each CSI-RS resource. This is not limited in this embodiment of this application.

In an optional embodiment, the method further includes:

the network device sends second configuration information by using third signaling, where the second configuration information is used to configure a CSI-IM resource group associated with at least one of the N CSI-RS resources, or the second configuration information is used to configure a CSI-IM resource group associated with each of the N CSI-RS resources.

In an optional embodiment, the third signaling is radio resource control RRC signaling or Media Access Control (Media Access Control, MAC) layer control element (control element, CE) signaling.

Specifically, signaling used to configure the CSI-IM resource group associated with each of the N CSI-RS resources may be RRC signaling or MAC CE signaling. Configuring a CSI-IM resource group by using RRC signaling is applicable to a scenario in which configuration of the CSI-IM resource group does not frequently change and is relatively stable. In this way, bit overheads of physical layer signaling and MAC layer signaling can be greatly reduced, because only selection from the CSI-IM resource group that has been configured by using the RRC signaling is required for the physical layer signaling. Therefore, bit overheads of the physical layer signaling can be reduced by properly configuring a quantity of CSI-IM resource groups. However, configuring a CSI-IM resource group by using MAC CE signaling is applicable to a scenario in which configuration of the CSI-IM resource group changes relatively dynamically. The MAC CE signaling is decoded faster than the RRC signaling. Therefore, in this scenario, it is more efficient for the network device to configure a CSI-IM resource group by using the MAC CE signaling. It should be understood that because a relatively large quantity of bits are required to configure a CSI-IM resource group, using DCI signaling to configure the CSI-IM resource group is not considered, to avoid unsustainable bit overheads of the DCI signaling.

In an optional embodiment, the quantity $n_i$ of CSI-IM resource groups associated with the $i^{th}$ CSI-RS resource meets $1 \leq n_i \leq N_1$, where $N_1$ is an integer, and $2 \leq N_1 \leq N$; and the first indication information includes $\lceil \log_2 N \rceil + \lceil \log_2 N_1 \rceil$ bits, where the $\lceil \log_2 N \rceil$ bits are used to indicate the target CSI-RS resource, and the $\lceil \log_2 N_1 \rceil$ bits are used to indicate the target CSI-IM resource group.

Specifically, the quantity $n_i$ of CSI-IM resource groups associated with the $i^{th}$ CSI-RS resource meets $1 \leq n_i \leq N_1$. In other words. $N_1$ is a maximum value of a quantity of CSI-IM resource groups associated with each CSI-RS resource. Because there are N CSI-IM resources, the network device may indicate the target CSI-RS resource by using the $\lceil \log_2 N \rceil$ bits. Because there are a maximum of $N_1$ CSI-IM resource groups for one CSI-RS resource, the network device may indicate the target CSI-IM resource group by using the $\lceil \log_2 N_1 \rceil$ bits. In this way, bit overheads of signaling of the network device are greatly reduced, and system performance is improved.

It should be understood that in this embodiment of this application, a quantity of bits of the first indication information is fixed. The fixed bit quantity can reduce complexity of performing blind detection on the first signaling by the terminal device. Particularly, when the first signaling is DCI signaling, reducing the complexity of the blind detection by the terminal device can improve efficiency of detecting the first signaling by the terminal device, and help the terminal device detect the first signaling fast and perform channel measurement on a corresponding CSI-RS resource and a corresponding CSI-IM resource group based on the first signaling, thereby improving channel state measurement efficiency. In addition, reducing the complexity of the blind detection by the terminal device can further reduce power consumption of the terminal device in detecting the first signaling, and prolong a standby time of the terminal device. Therefore, in this embodiment of this application, the maximum value $N_1$ of the quantity of CSI-IM resource groups associated with each CSI-RS resource is selected, and the target CSI-IM resource group is indicated by using the $\lceil \log_2 N_1 \rceil$ bits.

It should be further understood that the maximum value $N_1$ of the quantity of CSI-IM resource groups associated with each CSI-RS resource may be determined by the network device and the terminal device according to a predefined rule, or may be configured by the network device by using signaling. This is not limited in this embodiment of this application.

In an optional embodiment, before the network device sends the first indication information by using the first signaling, the method further includes:

the network device sends third configuration information by using fourth signaling, where the third configuration information is used to configure $N_1$.

In an optional embodiment, the third signaling is radio resource control RRC signaling or Media Access Control layer control element MAC CE signaling.

Specifically, signaling used to configure $N_1$ may be RRC signaling or MAC CE signaling.

It should be understood that in this embodiment of this application, the second signaling used to configure the N CSI-RS resources and the third signaling used to configure the CSI-IM resource group associated with each of the N CSI-RS resources may be same signaling or different signaling, and the second signaling and the fourth signaling used to configure $N_1$ may be same signaling or different signaling. This is not limited in this embodiment of this application.

In an optional embodiment, $N_1$ is determined by the network device according to a predefined rule.

In an optional embodiment, the predefined rule is $N_1=N$.

In an optional embodiment, the first signaling is downlink control information DCI.

Specifically, because the quantity of paired terminal devices of the terminal device dynamically changes, the first signaling used to notify the first indication information may be downlink control information DCI. It should be understood that a speed of decoding the DCI by the terminal device is relatively high. The network device notifies the first indication information by using the DCI, so that the terminal device can learn of the quantity of paired terminal devices of the terminal device in a timely manner, and obtain accurate configuration information of the target CSI-RS resource and the target CSI-IM resource group, to help the terminal device obtain a more accurate CQI.

In an optional embodiment, it may be considered that there are several first relationships between the N CSI-RS resources, and there are several second relationships in each first relationship. For example, in a $p^{th}$ first relationship, each CSI-IM resource group includes $x_p=p-1$ non-zero power CSI-RS resources, and each first relationship includes $y_p$ second relationships, where $$y_p = \left\lfloor \frac{N}{x_p+1} \right\rfloor (x_p+1),$$

and p is a positive integer less than or equal to $N_1$.

In this embodiment of this application, it may be understood that the N CSI-RS resources are grouped into $$\left\lfloor \frac{N}{x_p+1} \right\rfloor$$

groups, each group includes $x_p+1$ resources, and a set of identifiers of CSI-RS resources in a $q^{th}$ group is:

$$\{(x_p+1)(q-1)+1, (x_p+1)(q-1)+2,$$
$$\ldots, (x_p+1)(q-1)+x_p+1\}, \text{ where}$$
$$q = 1, 2, \ldots, \left\lfloor \frac{N}{x_p+1} \right\rfloor.$$

In the $q^{th}$ group, one CSI-RS resource is selected for measuring a channel coefficient, and remaining CSI-RS resources are used as CSI-IM resources for measuring interference, so that one second relationship in the $p^{th}$ first relationship is obtained.

Figure 3:
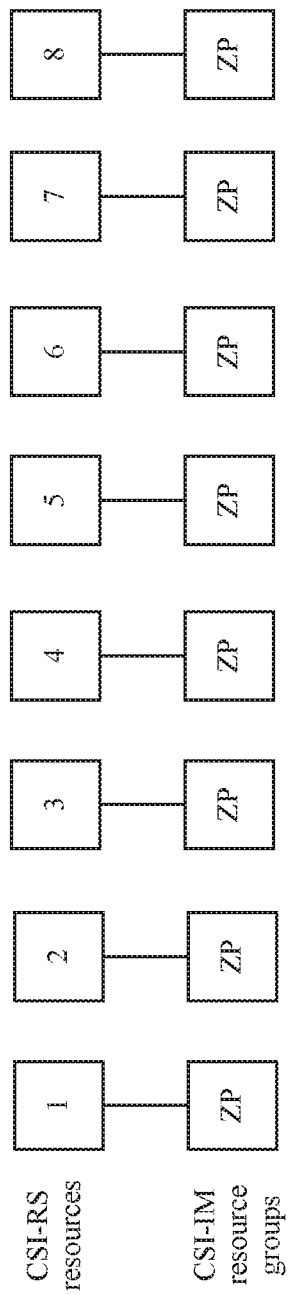
FIG. 3 shows an association relationship between a CSI-RS resource and a CSI-IM resource group according to an embodiment of this application.

For ease of understanding, N=8 is used as an example for description below. FIG. 3 to FIG. 10 show a CSI-IM resource group associated with each CSI-RS resource in eight CSI-RS resources. Identifiers of the eight CSI-RS resources are 1, 2, ..., and 8, and it is determined, according to a predetermined rule or based on configuration of the network device, that $N_1=N=8$. It may be understood that each of the eight CSI-RS resources is associated with a maximum of eight CSI-IM resource groups, FIG. 3 shows an association relationship between a CSI-RS resource and a CSI-IM resource group in a $1^{st}$ first relationship. In $1^{st}$ first relationship, $x_1=0$, and $$y_1 = \left\lfloor \frac{N}{x_1+1} \right\rfloor (x_1+1) = 8.$$

Therefore, the $1^{st}$ first relationship includes eight second relationships, and a CSI-IM resource group associated with each CSI-RS resource includes only one zero power CSI-RS resource.

Figure 4:
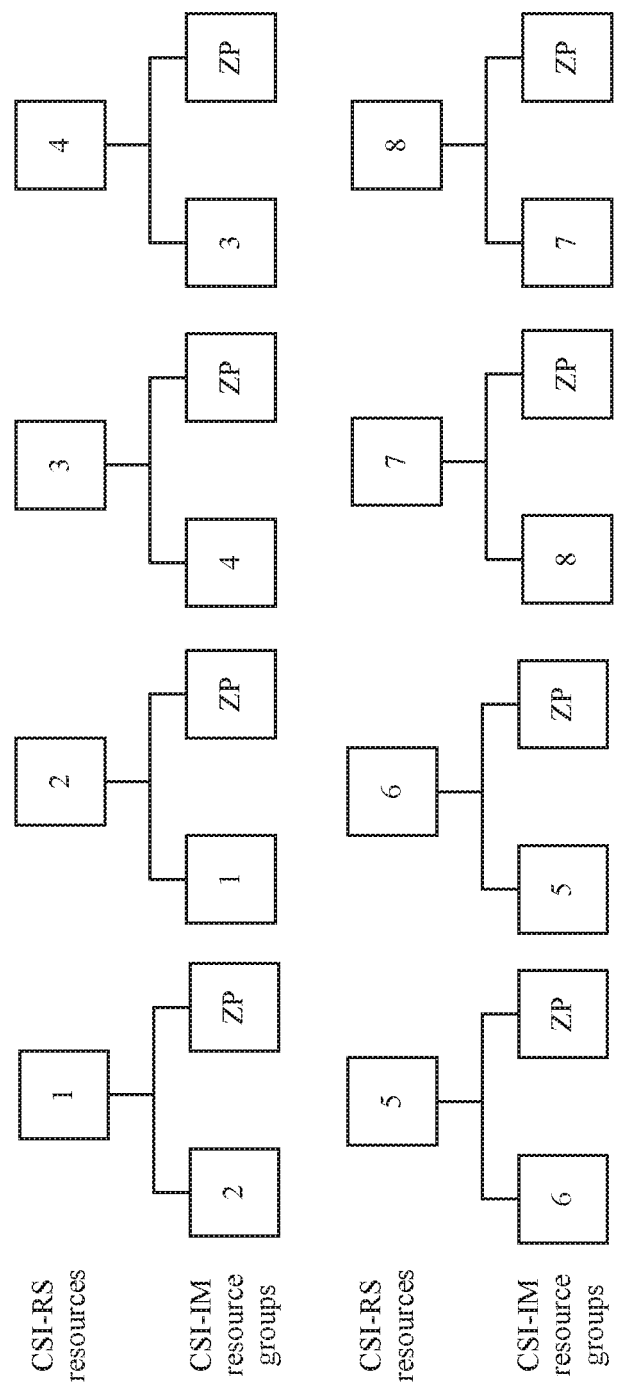
FIG. 4 shows another association relationship between a CSI-RS resource and a CSI-IM resource group according to an embodiment of this application.

FIG. 4 shows an association relationship between a CSI-RS resource and a CSI-IM resource group in a $2^{nd}$ first relationship. In the $2^{nd}$ first relationship, $x_2=1$, and $$y_2 = \left\lfloor \frac{N}{x_2+1} \right\rfloor (x_2+1) = 8.$$

Therefore, the $2^{nd}$ first relationship includes eight second relationships, and a CSI-IM resource group associated with each CSI-RS resource includes one non-zero power CSI-RS resource and one zero power CSI-RS resource.

Specifically, in the $2^{nd}$ first relationship, the eight CSI-RS resources are grouped into $$\left\lfloor \frac{N}{x_2+1} \right\rfloor = 4$$

groups, and identifiers of the groups of CSI-RS resources are {1, 2}, {3, 4}, {5, 6}, and {7, 8}. To be specific, a resource 1 is associated with a resource 2. If the resource 1 is used to measure a channel coefficient, the resource 2 is used to measure multi-user interference or a sum of power of multi-user interference and inter-cell interference, and the zero power CSI-RS resource is used to measure the inter-cell interference. Configuration of other resources is similar to the foregoing descriptions, and details are not described herein again.

Figure 5:
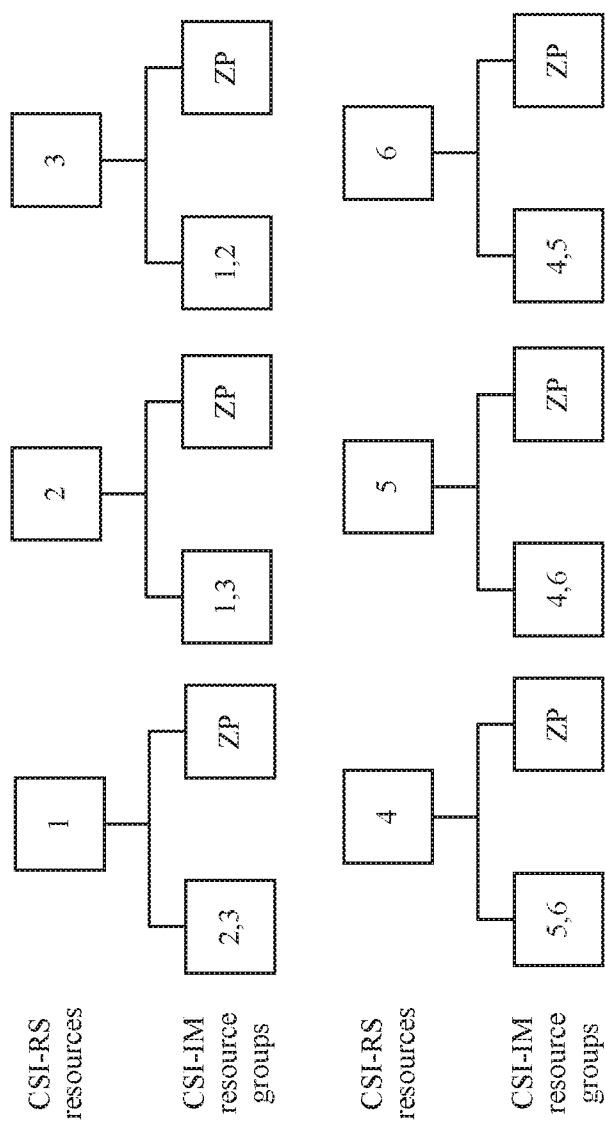
FIG. 5 shows another association relationship between a CSI-RS resource and a CSI-IM resource group according to an embodiment of this application.

FIG. 5 shows an association relationship between a CSI-RS resource and a CSI-IM resource group in a $3^{rd}$ first relationship. In the $3^{rd}$ first relationship, $x_3=2$, and $$y_3 = \left\lfloor \frac{N}{x_3+1} \right\rfloor (x_3+1) = 6.$$

Therefore, the 3$^{rd}$ first relationship includes six second relationships, and a CSI-IM resource group associated with each CSI-RS resource includes two non-zero power CSI-RS resources and one zero power CSI-RS resource.

Specifically, in the 3$^{rd}$ first relationship, the eight CSI-RS resources are grouped into $$\left\lfloor \frac{N}{x_3+1} \right\rfloor = 2$$

groups, and identifiers of the groups of CSI-RS resources are {1, 2, 3} and {4, 5, 6}. To be specific, a resource 1, a resource 2, and a resource 3 are associated. If the resource 1 is used to measure a channel coefficient, the resource 2 and the resource 3 are used to measure multi-user interference; or if the resource 2 is used to measure a channel coefficient, the resource 1 and the resource 3 are used to measure multi-user interference. Configuration of other resources is similar to the foregoing descriptions, and details are not described herein again.

Figure 6:
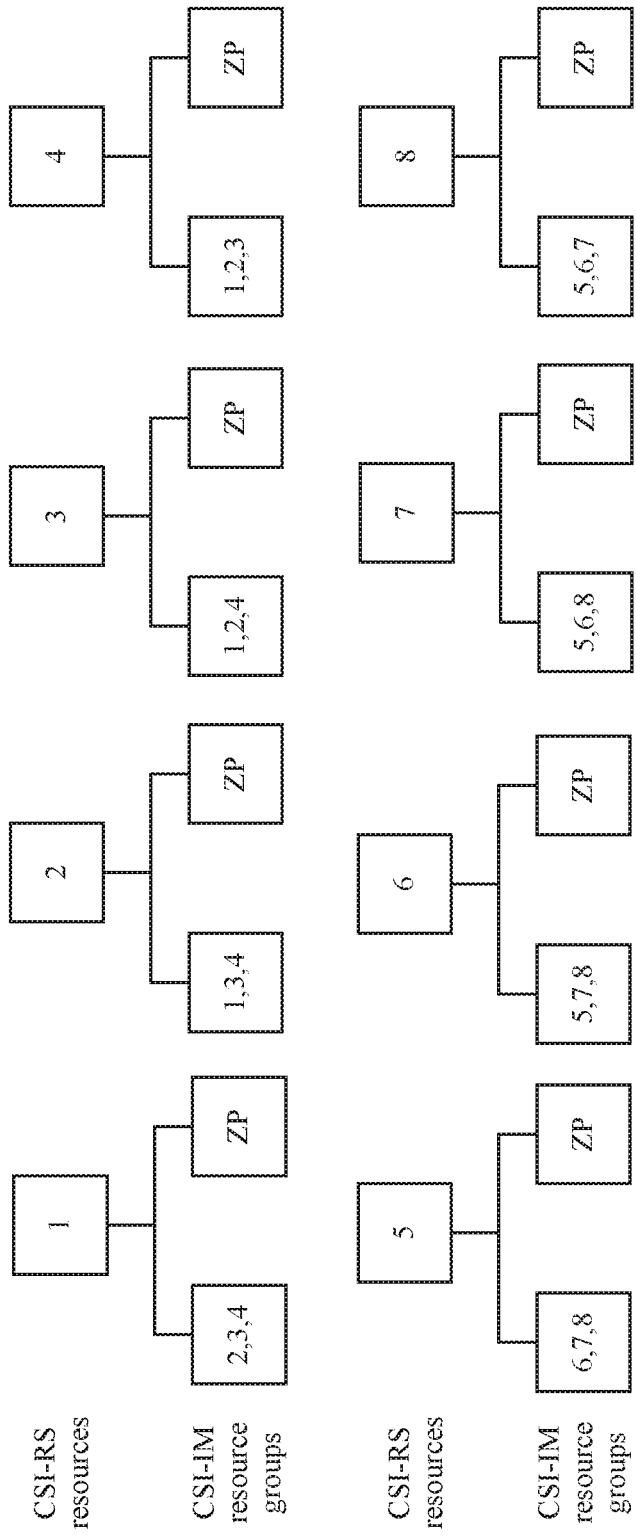
FIG. 6 shows another association relationship between a CSI-RS resource and a CSI-IM resource group according to an embodiment of this application.

FIG. 6 shows an association relationship between a CSI-RS resource and a CSI-IM resource group in a 4$^{th}$ first relationship. In the 4$^{th}$ first relationship, $x_4=3$, and $$y_4 = \left\lfloor \frac{N}{x_4+1} \right\rfloor (x_4+1) = 8.$$

Therefore, the 4$^{th}$ first relationship includes eight second relationships, and a CSI-IM resource group associated with each CSI-RS resource includes three non-zero power CSI-RS resources and one zero power CSI-RS resource.

Specifically, in the 4th first relationship, the eight CSI-RS resources are grouped into $$\left\lfloor \frac{N}{x_4+1} \right\rfloor = 2$$

groups, and identifiers of the groups of CSI-RS resources are {1, 2, 3, 4} and {5, 6, 7, 8}. Specifically, which CSI-RS resource is used as a CSI-RS resource for measuring a channel coefficient and which resource is configured as a CSI-IM resource are similar to the foregoing descriptions, and details are not described herein again.

Figure 7:
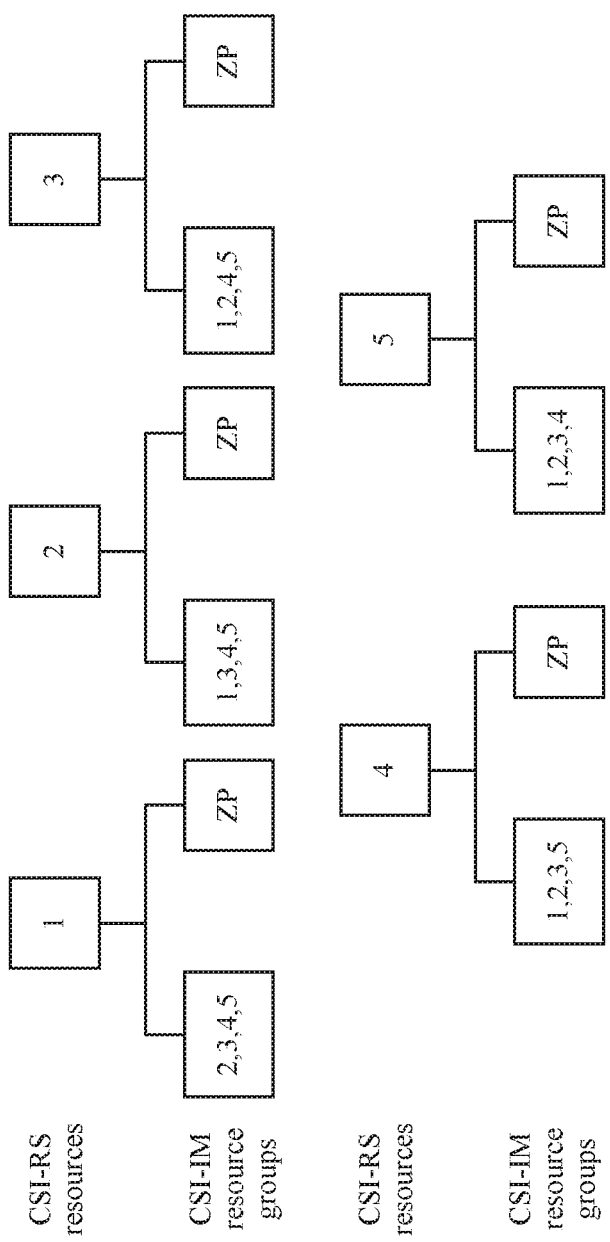
FIG. 7 shows another association relationship between a CSI-RS resource and a CSI-IM resource group according to an embodiment of this application.

FIG. 7 shows an association relationship between a CSI-RS resource and a CSI-IM resource group in a 5$^{th}$ first relationship. In the 5$^{th}$ first relationship, $x_5=4$, and $$y_5 = \left\lfloor \frac{N}{x_5+1} \right\rfloor (x_5+1) = 5.$$

Therefore, the 5$^{th}$ first relationship includes five second relationships, and a CSI-IM resource group associated with each CSI-RS resource includes four non-zero power CSI-RS resources and one zero power CSI-RS resource.

Specifically, in the 5$^{th}$ first relationship, the eight CSI-RS resources are grouped into $$\left\lfloor \frac{N}{x_5+1} \right\rfloor = 1$$

group, and identifiers of the group of CSI-RS resources are 1, 2, 3, 4, 5. Specifically, which CSI-RS resource is used as a CSI-RS resource for measuring a channel coefficient and which resource is configured as a CSI-IM resource are similar to the foregoing descriptions, and details are not described herein again.

Figure 8:
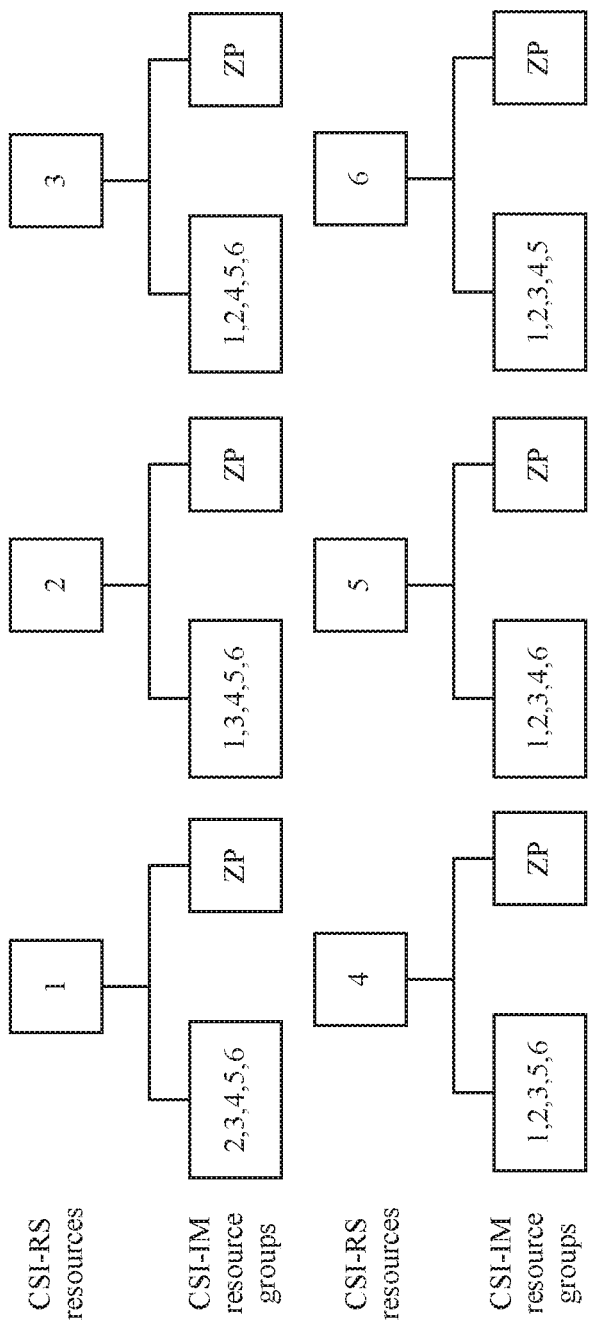
FIG. 8 shows another association relationship between a CSI-RS resource and a CSI-IM resource group according to an embodiment of this application.

FIG. 8 shows an association relationship between a CSI-RS resource and a CSI-IM resource group in a 6$^{th}$ first relationship. In the 6$^{th}$ first relationship, $x_6=5$, and $$y_6 = \left\lfloor \frac{N}{x_6+1} \right\rfloor (x_6+1) = 6.$$

Therefore, the 6$^{th}$ first relationship includes six second relationships, and a CSI-IM resource group associated with each CSI-RS resource includes five non-zero power CSI-RS resources and one zero power CSI-RS resource.

Specifically, in the 6$^{th}$ first relationship, the eight CSI-RS resources are grouped into $$\left\lfloor \frac{N}{x_6+1} \right\rfloor = 1$$

group, and identifiers of the group of CSI-RS resources are {1, 2, 3, 4, 5, 6}. Specifically, which CSI-RS resource is used as a CSI-RS resource for measuring a channel coefficient and which resource is configured as a CSI-IM resource are similar to the foregoing descriptions, and details are not described herein again.

Figure 9:
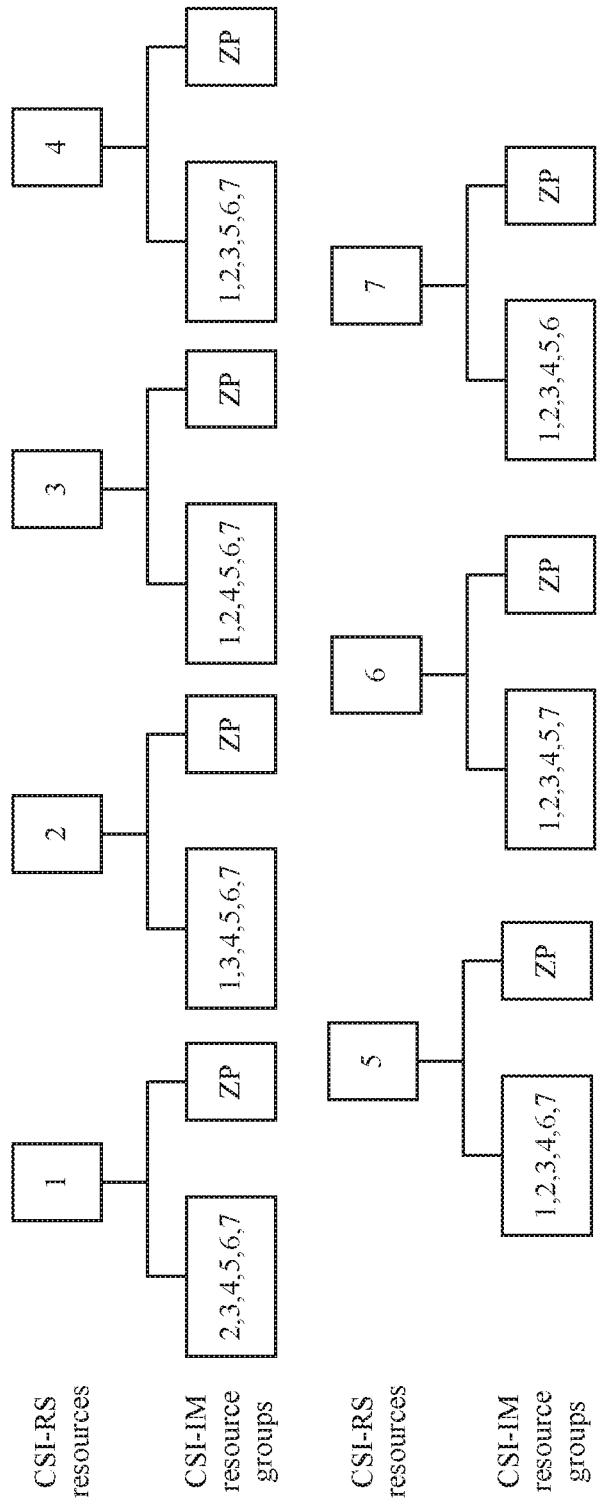
FIG. 9 shows another association relationship between a CSI-RS resource and a CSI-IM resource group according to an embodiment of this application.

FIG. 9 shows an association relationship between a CSI-RS resource and a CSI-IM resource group in a 7$^{th}$ first relationship. In the 7$^{th}$ first relationship, $x_7=6$, and $$y_7 = \left\lfloor \frac{N}{x_7+1} \right\rfloor (x_7+1) = 7.$$

Therefore, the 7$^{th}$ first relationship includes seven second relationships, and a CSI-IM resource group associated with each CSI-RS resource includes six non-zero power CSI-RS resources and one zero power CSI-RS resource.

Specifically, in the 7$^{th}$ first relationship, the eight CSI-RS resources are grouped into $$\left\lfloor \frac{N}{x_7+1} \right\rfloor = 1$$

group, and identifiers of the group of CSI-RS resources are {1, 2, 3, 4, 5, 6, 7}. Specifically, which CSI-RS resource is used as a CSI-RS resource for measuring a channel coefficient and which resource is configured as a CSI-IM resource are similar to the foregoing descriptions, and details are not described herein again.

Figure 10:
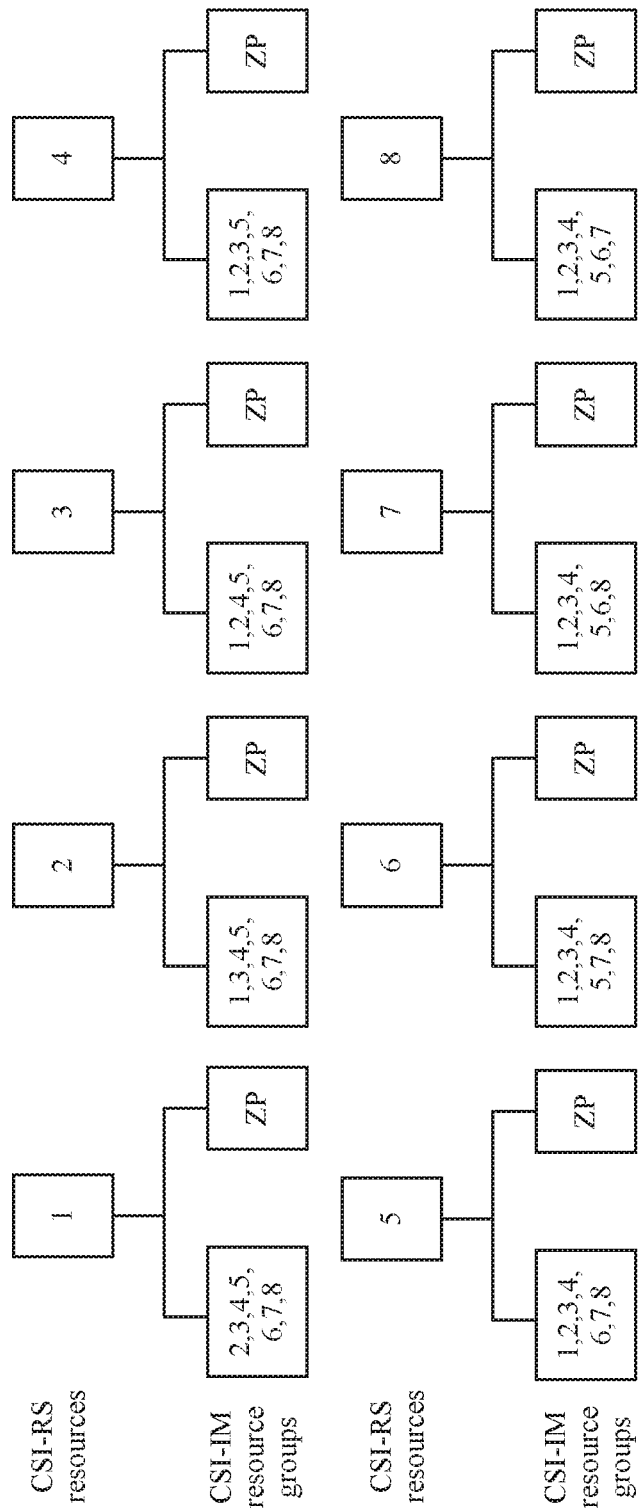
FIG. 10 shows another association relationship between a CSI-RS resource and a CSI-IM resource group according to an embodiment of this application.

FIG. 10 shows an association relationship between a CSI-RS resource and a CSI-IM resource group in an 8$^{th}$ first relationship. In the 8$^{th}$ first relationship, $x_8=7$, and $$y_8 = \left\lfloor \frac{N}{x_8+1} \right\rfloor (x_8+1) = 8.$$

Therefore, the $8^{th}$ first relationship includes eight second relationships, and a CSI-IM resource group associated with each CSI-RS resource includes seven non-zero power CSI-RS resources and one zero power CSI-RS resource.

Specifically, in the $8^{th}$ first relationship, the eight CSI-RS resources are grouped into $$\left\lfloor \frac{N}{x_8+1} \right\rfloor = 1$$

group, and identifiers of the group of CSI-RS resources are {1, 2, 3, 4, 5, 6, 7, 8}. Specifically, which CSI-RS resource is used as a CSI-RS resource for measuring a channel coefficient and which resource is configured as a CSI-IM resource are similar to the foregoing descriptions, and details are not described herein again.

The network device or the terminal device may extract, from all the foregoing first relationships, all second relationships in which the $i^{th}$ CSI-RS resource is used as a resource for measuring a channel coefficient, in other words, obtain the $n_i$ CSI-IM resource groups associated with the $i^{th}$ CSI-RS resource, where i=1, 2, ..., N. For example, there are $n_1$=8 CSI-IM groups associated with a first CSI-RS resource, and sets of CSI-RS resources included in the CSI-IM resource groups are {ZP}, {2, ZP}, {2, 3, ZP}, {2, 3, 4, ZP}, {2, 3, 4, 5, ZP}, {2, 3, 4, 5, 6, ZP}, {2, 3, 4, 5, 6, 7, ZP}, and {2, 3, 4, 5, 6, 7, 8, ZP}. For another example, there are $n_7$=5 CSI-IM resource groups associated with a seventh CSI-RS resource, and sets of CSI-RS resources included in the CSI-IM resource groups are {ZP}, {8, ZP}, {5, 6, 8, ZP}, {1, 2, 3, 4, 5, 6, ZP}, and {1, 2, 3, 4, 5, 6, 8, ZP}.

It should be understood that in an actual application process, the network device and the terminal device may determine the foregoing association relationship between a CSI-RS resource and a CSI-IM resource group in a plurality of manners. Optionally, a CSI-IM resource group associated with each CSI-RS resource may be configured by the network device for the terminal device by using signaling (such as RRC signaling or MAC CE signaling). Alternatively, the network device and the terminal device may directly determine all the first relationships and the second relationships according to a predefined rule and a value of N, so as to determine all CSI-IM resource groups. Alternatively, the network device and the terminal device may select, from all the first relationships and the second relationships, the first $N_1$ CSI-IM resource groups for each CSI-RS resource according to a predefined rule and the configured $N_1$, and use the first $N_1$ CSI-IM resource groups as CSI-IM resource groups associated with the CSI-RS resource. It should be understood that a specific configuration manner in which the network device configures, for the terminal device by using signaling, the CSI-IM resource group associated with each CSI-RS resource has been described above, and details are not described herein again.

It should be understood that sequence numbers of the foregoing processes do not mean execution sequences. The execution sequences of the processes should be determined based on functions and internal logic of the processes, and should not be construed as any limitation on the implementation processes of the embodiments of this application.

The channel state measurement method in the embodiments of this application is described in detail above with reference to FIG. 1 to FIG. 10. A channel state measurement apparatus in the embodiments of this application is described in detail below with reference to FIG. 11 to FIG. 14.

Figure 11:
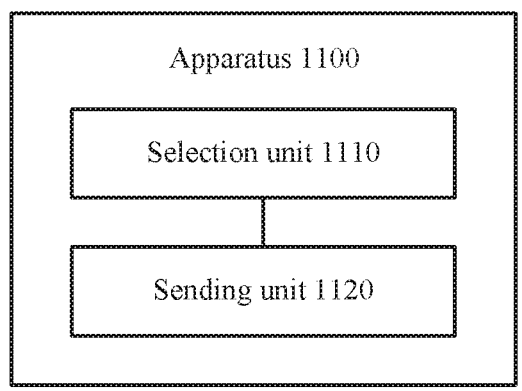
FIG. 11 is a schematic block diagram of a channel state measurement apparatus according to an embodiment of this application.

FIG. 11 shows a channel state measurement apparatus 1100 according to an embodiment of this application. The apparatus 1100 includes:

a selection unit 1110, configured to select, from N channel state information-reference signal CSI-RS resources, a target CSI-RS resource and a target channel state information-interference measurement CSI-IM resource group associated with the target CSI-RS resource, where the target CSI-IM resource group includes a CSI-RS resource in the N CSI-RS resources, an $i^{th}$ CSI-RS resource in the N CSI-RS resources is associated with $n_i$ CSI-IM resource groups, and a $k^{th}$ CSI-IM resource group in the $n_i$ CSI-IM resource groups includes $x_{ik}$ CSI-RS resources in the N CSI-RS resources except the $i^{th}$ CSI-RS resource, where N, i, $n_i$, k, and $x_{ik}$ are all integers, N≥2, i=1, 2, ..., N, 1≤$n_i$≤N, k=1, 2, ..., $n_i$, 0≤$x_{ik}$≤N−1, j∈{1, 2, ..., N}, and $n_i$≥2; and a sending unit 1120, configured to send first indication information by using first signaling, where the first indication information is used to indicate the target CSI-RS resource and the target CSI-IM resource group.

According to the channel state measurement apparatus in this embodiment of this application, a CSI-IM resource group associated with each of the N CSI-RS resources is configured in a particular manner, and therefore a quantity of configured CSI-IM resource groups does not exceed the preset quantity N of CSI-RS resources while meeting a requirement for a dynamic change in a quantity of paired terminal devices. In this way, bit overheads used by a network device to select a CSI-IM resource can be reduced, and a payload size of signaling can be reduced, thereby improving system performance.

Optionally, in $n_j$ CSI-IM resource groups associated with a $j^{th}$ CSI-RS resource in the N CSI-RS resources, different CSI-IM resource groups include different quantities of CSI-RS resources.

Optionally, identifiers of the N CSI-RS resources are 1, 2, ..., N, and a set of identifiers of CSI-RS resources included in the $k^{th}$ CSI-IM resource group in the $n_i$ CSI-IM resource groups associated with the $i^{th}$ CSI-RS resource is:

$$\left\{ \left\lfloor \frac{i-1}{x_{ik}+1} \right\rfloor (x_{ik}+1)+1, \left\lfloor \frac{i-1}{x_{ik}+1} \right\rfloor (x_{ik}+1)+2, \ldots, \left\lfloor \frac{i-1}{x_{ik}+1} \right\rfloor (x_{ik}+1)+x_{ik}+1 \right\} / \{i\},$$

where a set A/a set B represents a set of remaining elements in the set A after elements in the set B are removed from the set A.

Optionally, identifiers of the N CSI-RS resources are 1, 2, ..., N, a quantity of CSI-IM resource groups associated with the $i^{th}$ CSI-RS resource is $n_i$=N+1−i, and a set of identifiers of CSI-RS resources included in the $k^{th}$ CSI-IM resource group is:

{1, 2, ..., i+k−1}/{i}, where a set A/a set B represents a set of remaining elements in the set A after elements in the set B are removed from the set A.

Optionally, the N CSI-RS resources are non-zero power CSI-RS resources, and each CSI-IM resource group further includes a zero power CSI-RS resource.

Optionally, the sending unit 1120 is further configured to: before the target CSI-RS resource and the target channel state information-interference measurement CSI-IM resource group associated with the target CSI-RS resource are selected from the N channel state information-reference signal CSI-RS resources, send first configuration information by using second signaling, where the first configuration information is used to configure the N CSI-RS resources.

Optionally, the second signaling is radio resource control RRC signaling.

Optionally, the sending unit 1120 is further configured to send second configuration information by using third signaling, where the second configuration information is used to configure a CSI-IM resource group associated with each of the N CSI-RS resources.

Optionally, the quantity $n_i$ of CSI-IM resource groups associated with the $i^{th}$ CSI-RS resource meets $1 \le n_i \le N_1$, where $N_1$ is an integer, and $2 \le N_1 \le N$; and the first indication information includes $\lceil \log_2 N \rceil + \lceil \log_2 N_1 \rceil$ bits, where the $\lceil \log_2 N \rceil$ bits are used to indicate the target CSI-RS resource, and the $\lceil \log_2 N_1 \rceil$ bits are used to indicate the target CSI-IM resource group.

Optionally, the sending unit 1120 is further configured to: before sending the first indication information by using the first signaling, send third configuration information by using fourth signaling, where the third configuration information is used to configure $N_1$.

Optionally, $N_1$ is determined by the apparatus according to a predefined rule.

Optionally, the first signaling is downlink control information DCI.

It should be understood that the apparatus 1100 herein is embodied in a form of a functional unit. The term "unit" herein may be an application-specific integrated circuit (application-specific integrated circuit, ASIC), an electronic circuit, a processor (for example, a shared processor, a dedicated processor, or a packet processor) for executing one or more software or firmware programs, a memory, a combined logic circuit, and/or another proper component for supporting the described functions. In an optional example, a person skilled in the art may understand that the apparatus 1100 may be specifically the network device in the foregoing embodiment, and the apparatus 1100 may be configured to perform procedures and/or steps corresponding to the network device in the foregoing method embodiment. To avoid repetition, details are not described herein again.

Figure 12:
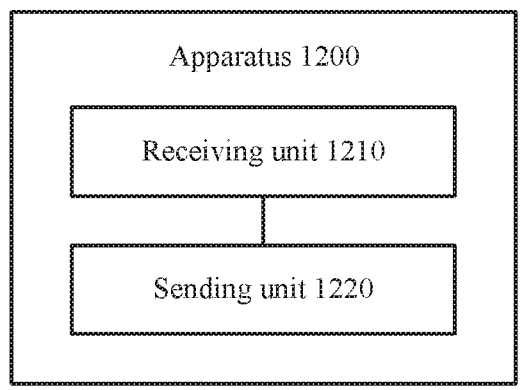
FIG. 12 is a schematic block diagram of another channel state measurement apparatus according to an embodiment of this application.

FIG. 12 shows another channel state measurement apparatus 1200 according to an embodiment of this application. The apparatus 1200 includes:

a receiving unit 1210, configured to receive first signaling, where the first signaling carries first indication information, the first indication information is used to indicate a target channel state information-reference signal CSI-RS resource and a target channel state information-interference measurement CSI-IM resource group, the target CSI-IM resource group includes a CSI-RS resource in the N CSI-RS resources, an $i^{th}$ CSI-RS resource in the N CSI-RS resources is associated with $n_i$ CSI-IM resource groups, and a $k^{th}$ CSI-IM resource group in the $n_i$ CSI-IM resource groups includes $x_{ik}$ CSI-RS resources in the N CSI-RS resources except the $i^{th}$ CSI-RS resource, where N, i, $n_i$, k, and $x_{ik}$ are all integers, $N \ge 2$, i=1, 2, ..., N, $1 \le n_i \le N$, k=1, 2, ..., $n_i$, $0 \le x_{ik} \le N-1$, $j \in \{1, 2, ..., N\}$, and $n_j \ge 2$; and a sending unit 1220, configured to report a channel quality indicator COI, where the COI is determined based on a channel coefficient measured by the apparatus on the target CSI-RS resource and interference measured by the apparatus on the CSI-RS resource in the target CSI-IM resource group.

According to the channel state measurement apparatus in this embodiment of this application, a CSI-IM resource group associated with each of the N CSI-RS resources is configured in a particular manner, and therefore a quantity of configured CSI-IM resource groups does not exceed the preset quantity N of CSI-RS resources while meeting a requirement for a dynamic change in a quantity of paired terminal devices. In this way, bit overheads used by a network device to select a CSI-IM resource can be reduced, and a payload size of signaling can be reduced, thereby improving system performance.

Optionally, in $n_j$ CSI-IM resource groups associated with a $j^{th}$ CSI-RS resource in the N CSI-RS resources, different CSI-IM resource groups include different quantities of CSI-RS resources.

Optionally, identifiers of the N CSI-RS resources are 1, 2, ..., N, and a set of identifiers of CSI-RS resources included in the $k^{th}$ CSI-IM resource group in the $n_i$ CSI-IM resource groups associated with the $i^{th}$ CSI-RS resource is:

$$\left\{ \left\lfloor \frac{i-1}{x_{ik}+1} \right\rfloor (x_{ik}+1)+1, \left\lfloor \frac{i-1}{x_{ik}+1} \right\rfloor (x_{ik}+1)+2, \ldots, \left\lfloor \frac{i-1}{x_{ik}+1} \right\rfloor (x_{ik}+1)+x_{ik}+1 \right\} \Big/ \{i\},$$

where a set A/a set B represents a set of remaining elements in the set A after elements in the set B are removed from the set A.

Optionally, identifiers of the N CSI-RS resources are 1, 2 ..., N, a quantity of CSI-IM resource groups associated with the $i^{th}$ CSI-RS resource is $n_i = N+1-i$, and a set of identifiers of CSI-RS resources included in the $k^{th}$ CSI-IM resource group is:

$$\{1, 2, \ldots, i+k-1\}/\{i\}, \text{ where}$$

a set A/a set B represents a set of remaining elements in the set A after elements in the set B are removed from the set A.

Optionally, the N CSI-RS resources are non-zero power CSI-RS resources, and each CSI-IM resource group further includes a zero power CSI-RS resource.

Optionally, the receiving unit 1210 is further configured to receive second signaling before receiving the first signaling, where the second signaling carries first configuration information, and the first configuration information is used to configure the N CSI-RS resources.

Optionally, the second signaling is radio resource control RRC signaling.

Optionally, the receiving unit 1210 is further configured to receive third signaling, where the third signaling carries second configuration information, and the second configuration information is used to configure a CSI-IM resource group associated with each of the N CSI-RS resources.

Optionally, the quantity $n_i$ of CSI-IM resource groups associated with the $i^{th}$ CSI-RS resource meets $1 \le n_i \le N_1$, where $N_1$ is an integer, and $2 \le N_1 \le N$; and the first indication information includes $\lceil \log_2 N \rceil + \lceil \log_2 N_1 \rceil$ bits, where the $\lceil \log_2 N \rceil$ bits are used to indicate the target CSI-RS resource, and the $\lceil \log_2 N_1 \rceil$ bits are used to indicate the target CSI-IM resource group.

Optionally, the receiving unit 1210 is further configured to receive fourth signaling before receiving the first signaling, where the fourth signaling carries third configuration information, and the third configuration information is used to configure $N_1$.

Optionally, $N_1$ is determined by the terminal device according to a predefined rule.

Optionally, the first signaling is downlink control information DCI.

It should be understood that the apparatus 1200 wherein is embodied in a form of a functional unit. The term "unit" herein may be an application-specific integrated circuit (application-specific integrated circuit, ASIC), an electronic circuit, a processor (for example, a shared processor, a dedicated processor, or a packet processor) for executing one or more software or firmware programs, a memory, a combined logic circuit, and/or another proper component for supporting the described functions. In an optional example, a person skilled in the art may understand that the apparatus 1200 may be specifically the terminal device in the foregoing embodiment, and the apparatus 1200 may be configured to perform procedures and/or steps corresponding to the terminal device in the foregoing method embodiment. To avoid repetition, details are not described herein again.

Figure 13:
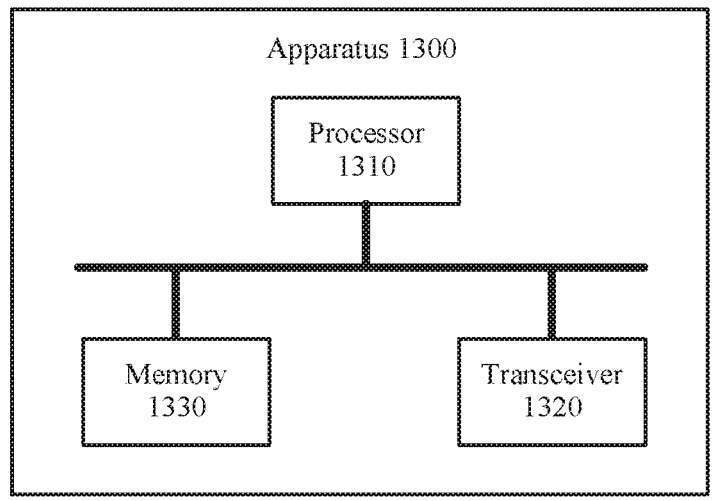
FIG. 13 is a schematic block diagram of another channel state measurement apparatus according to an embodiment of this application.

FIG. 13 shows another channel state measurement apparatus 1300 according to an embodiment of this application. The apparatus 1300 includes a processor 1310, a transceiver 1320, and a memory 1330. The processor 1310, the transceiver 1320, and the memory 1330 communicate with each other through an internal connection channel. The memory 1330 is configured to store an instruction. The processor 1310 is configured to execute the instruction stored in the memory 1330, to control the transceiver 1320 to send a signal and/or receive a signal.

The processor 1310 is configured to select, from N channel state information-reference signal CSI-RS resources, a target CSI-RS resource and a target channel state information-interference measurement CSI-IM resource group associated with the target CSI-RS resource, where the target CSI-IM resource group includes a CSI-RS resource in the N CSI-RS resources, an $i^{th}$ CSI-RS resource in the N CSI-RS resources is associated with $n_i$ CSI-IM resource groups, and a $k^{th}$ CSI-IM resource group in the $n_i$ CSI-IM resource groups includes $x_{ik}$ CSI-RS resources in the N CSI-RS resources except the $i^{th}$ CSI-RS resource, where N, i, $n_i$, k, and $x_{ik}$ are all integers, $N \geq 2$, $i=1, 2, \ldots, N$, $1 \leq n_i \leq N$, $k=1, 2, \ldots, n_i$, $0 \leq x_{ik} \leq N-1$, $j \in \{1, 2, \ldots, N\}$, and $n_j \geq 2$.

The transceiver 1320 is configured to send first indication information by using first signaling, where the first indication information is used to indicate the target CSI-RS resource and the target CSI-IM resource group.

It should be understood that the apparatus 1300 may be specifically the network device in the foregoing embodiment, and may be configured to perform steps and/or procedures corresponding to the network device in the foregoing method embodiment. Optionally, the memory 1330 may include a read-only memory and a random access memory, and provide an instruction and data for the processor. A part of the memory may further include a non-volatile random access memory. For example, the memory may further store information about a device type. The processor 1310 may be configured to execute the instruction stored in the memory. In addition, when the processor 1310 executes the instruction stored in the memory, the processor 1310 is configured to perform the steps and/or procedures corresponding to the network device in the foregoing method embodiment.

Figure 14:
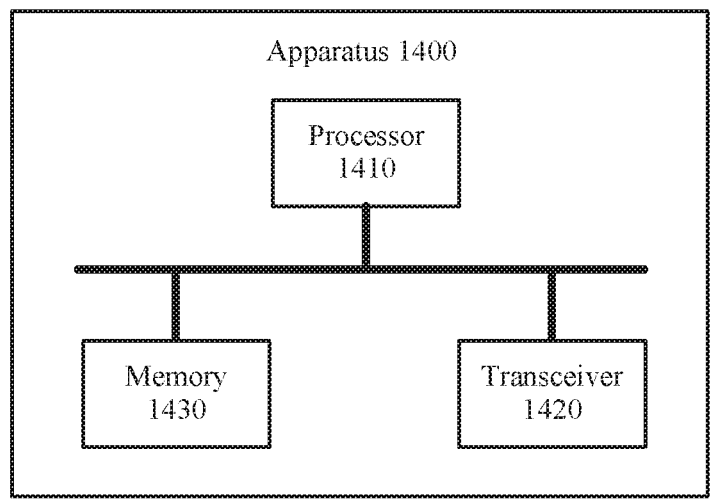
FIG. 14 is a schematic block diagram of another channel state measurement apparatus according to an embodiment of this application.

FIG. 14 shows another channel state measurement apparatus 1400 according to an embodiment of this application. The apparatus 1400 includes a processor 1410, a transceiver 1420, and a memory 1430. The processor 1410, the transceiver 1420, and the memory 1430 communicate with each other through an internal connection channel. The memory 1430 is configured to store an instruction. The processor 1410 is configured to execute the instruction stored in the memory 1430, to control the transceiver 1420 to send a signal and/or receive a signal.

The transceiver 1420 is configured to receive first signaling, where the first signaling carries first indication information, the first indication information is used to indicate a target channel state information-reference signal CSI-RS resource and a target channel state information-interference measurement CSI-IM resource group, the target CSI-IM resource group includes a CSI-RS resource in the N CSI-RS resources, an $i^{th}$ CSI-RS resource in the N CSI-RS resources is associated with $n_i$ CSI-IM resource groups, and a $k^{th}$ CSI-IM resource group in the $n_i$ CSI-IM resource groups includes $x_{ik}$ CSI-RS resources in the N CSI-RS resources except the $i^{th}$ CSI-RS resource, where N, i, $n_i$, k, and $x_{ik}$ are all integers, $N \geq 2$, $i=1, 2, \ldots, N$, $1 \leq n_i \leq N$, $k=1, 2, \ldots, n_i$, $0 \leq x_{ik} \leq N-1$, $j \in \{1, 2, \ldots, N\}$, and $n_j \geq 2$.

The transceiver 1420 is further configured to report a channel quality indicator CQI where the CQI is determined based on a channel coefficient measured by the apparatus on the target CSI-RS resource and interference measured by the apparatus on the CSI-RS resource in the target CSI-IM resource group.

It should be understood that the apparatus 1400 may be specifically the terminal device in the foregoing embodiment, and may be configured to perform steps and/or procedures corresponding to the terminal device in the foregoing method embodiment. Optionally, the memory 1430 may include a read-only memory and a random access memory, and provide an instruction and data for the processor. A part of the memory may further include a nonvolatile random access memory. For example, the memory may further store information about a device type. The processor 1410 may be configured to execute the instruction stored in the memory. In addition, when the processor 1410 executes the instruction stored in the memory, the processor 1410 is configured to perform the steps and/or procedures corresponding to the terminal device in the foregoing method embodiment.

It should be understood that in the embodiments of this application, the processor in the foregoing apparatus may be a central processing unit (central processing unit, CPU), or the processor may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

In an implementation process, the steps in the foregoing method can be implemented by using a hardware integrated logical circuit in the processor, or by using instructions in a form of software. The steps of the method disclosed with reference to the embodiments of this application may be directly performed by a hardware processor, or may be performed by using a combination of hardware in the processor and a software unit. The software unit may be located in a mature storage medium in the art, such as a random access memory, a flash memory, a read-only memory, a programmable read-only memory, an electrically erasable programmable memory, or a register. The storage medium is located in the memory, and the processor executes the instruction in the memory and completes the steps in the foregoing method in combination with hardware of the processor. To avoid repetition, details are not described herein again.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

A person of ordinary skill in the art may be aware that in combination with the embodiments disclosed in this specification, method steps and units can be implemented by electronic hardware, computer software, or a combination thereof. To clearly describe the interchangeability between the hardware and the software, steps and compositions of each embodiment are generally described above based on functions. Whether the functions are performed by hardware or software depends on particular applications and design constraints of the technical solutions. A person of ordinary skill in the art may use different methods to implement the described functions for each particular application, but it should not be considered that the implementation goes beyond the scope of this application.

It may be clearly understood by a person skilled in the art that for the purpose of convenient and brief description, for a specific working process of the foregoing system, apparatus, and unit, refer to a corresponding process in the foregoing method embodiment. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections between the apparatuses or units implemented through some interfaces, or may be electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in the embodiments of this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A channel state measurement method, comprising:
   selecting, by a network device from N channel state information-reference signal (CSI-RS) resources, a target CSI-RS resource and a target channel state information-interference measurement (CSI-IM) resource group associated with the target CSI-RS resource, wherein the target CSI-IM resource group comprises a CSI-RS resource in the N CSI-RS resources, an $i^{th}$ CSI-RS resource in the N CSI-RS resources is associated with $n_i$ CSI-IM resource groups, and a $k^{th}$ CSI-IM resource group in the $n_i$ CSI-IM resource groups comprises $x_{ik}$ CSI-RS resources in the N CSI-RS resources except the $i^{th}$ CSI-RS resource, wherein N, i, $n_i$, k, and $x_{ik}$ are all integers, N≥2, 1≤$n_i$≤N, k=1, 2, . . . , $n_i$, 0≤$x_{ik}$≤N−1, j∈{1, 2, . . . , N}, and $n_j$≥2, and wherein the quantity $n_i$ of CSI-IM resource groups associated with the $i^{th}$ CSI-RS resource meets 1≤$n_i$≤$N_1$, $N_1$, is an integer, and 2≤$N_1$≤N; and
   sending, by the network device, first indication information by using first signaling, wherein the first indication information indicates the target CSI-RS resource and the target CSI-IM resource group, the first indication information comprises $\lceil \log_2 N \rceil + \lceil \log_2 N_1 \rceil$ bits, the $\lceil \log_2 N \rceil$ bits indicate the target CSI-RS resource, and the $\lceil \log_2 N_1 \rceil$ bits indicate the target CSI-IM resource group.

2. The method according to claim 1, wherein in $n_j$ CSI-IM resource groups associated with a $j^{th}$ CSI-RS resource in the N CSI-RS resources, different CSI-IM resource groups comprise different quantities of CSI-RS resources.

3. The method according to claim 1, wherein identifiers of the N CSI-RS resources are 1, 2, . . . ,N, and a set of identifiers of CSI-RS resources comprised in the $k^{th}$ CSI-IM resource group in the $n_i$ CSI-IM resource groups associated with the $i^{th}$ CSI-RS resource is:

$$\left\{ \left\lfloor \frac{i-1}{x_{ik}+1} \right\rfloor (x_{ik}+1)+1, \left\lfloor \frac{i-1}{x_{ik}+1} \right\rfloor (x_{ik}+1)+2, \dots , \right.$$

-continued $$\left\lfloor \frac{i-1}{x_{ik}+1} \right\rfloor (x_{ik}+1) + x_{ik} + 1 \right\} \Big/ \{i\},$$

wherein
  a set A/a set B represents a set of remaining elements in the set A after elements in the set B are removed from the set A.

4. A channel state measurement method, comprising:
  receiving, by a terminal device, first signaling, wherein the first signaling carries first indication information, the first indication information indicates a target channel state information-reference signal (CSI-RS) resource and a target channel state information-interference measurement (CSI-IM) resource group, the target CSI-IM resource group comprises a CSI-RS resource in the N CSI-RS resources, an $i^{th}$ CSI-RS resource in the N CSI-RS resources is associated with $n_i$ CSI-IM resource groups, and a $k^{th}$ CSI-IM resource group in the $n_i$ CSI-IM resource groups comprises $x_{ik}$ CSI-RS resources in the N CSI-RS resources except the $i^{th}$ CSI-RS resource, wherein N, i, $n_i$, k, and $x_{ik}$ are all integers, $N \geq 2$, $1 \leq n_i \leq N$, $k=1, 2, \ldots, n_i$, $0 \leq x_{ik} \leq N-1$, $j \in \{1, 2, \ldots, N\}$, and $n_j \geq 2$, wherein the quantity $n_i$ of CSI-IM resource groups associated with the $i^{th}$ CSI-RS resource meets $1 \leq n_i \leq N_1$, $N_1$, is an integer, and $2 \leq N_1 \leq N$, and wherein the first indication information comprises $\lceil \log_2 N \rceil + \lceil \log_2 N_1 \rceil$ bits, the $\lceil \log_2 N \rceil$ bits indicate the target CSI-RS resource, and the $\lceil \log_2 N_1 \rceil$ bits indicate the target CSI-IM resource group; and
  reporting, by the terminal device, a channel quality indicator (CQI), wherein the CQI is determined based on a channel coefficient measured by the terminal device on the target CSI-RS resource and interference measured by the terminal device on the CSI-RS resource in the target CSI-IM resource group.

5. The method according to claim 4, wherein in $n_j$ CSI-IM resource groups associated with a $j^{th}$ CSI-RS resource in the N CSI-RS resources, different CSI-IM resource groups comprise different quantities of CSI-RS resources.

6. The method according to claim 4, wherein identifiers of the N CSI-RS resources are 1, 2, . . . , N, and a set of identifiers of CSI-RS resources comprised in the $k^{th}$ CSI-IM resource group in the $n_i$ CSI-IM resource groups associated with the $i^{th}$ CSI-RS resource is:

$$\left\{ \left\lfloor \frac{i-1}{x_{ik}+1} \right\rfloor (x_{ik}+1) + 1, \left\lfloor \frac{i-1}{x_{ik}+1} \right\rfloor (x_{ik}+1) + 2, \ldots, \right.$$

$$\left. \left\lfloor \frac{i-1}{x_{ik}+1} \right\rfloor (x_{ik}+1) + x_{ik} + 1 \right\} \Big/ \{i\},$$

wherein
  a set A/a set B represents a set of remaining elements in the set A after elements in the set B are removed from the set A.

7. The method according to claim 4, wherein identifiers of the N CSI-RS resources are 1, 2, . . . , N, a quantity of CSI-IM resource groups associated with the $i^{th}$ CSI-RS resource is $n_i = N+1-i$, and a set of identifiers of CSI-RS resources comprised in the $k^{th}$ CSI-IM resource group is:

{1, 2, . . . , i+k−1}/{i}, wherein a set A/a set B represents a set of remaining elements in the set A after elements in the set B are removed from the set A.

8. The method according to claim 4, wherein the N CSI-RS resources are non-zero power CSI-RS resources, and each CSI-IM resource group further comprises a zero power CSI-RS resource.

9. The method according to claim 4, wherein before the receiving, by a terminal device, first signaling, the method further comprises:
  receiving, by the terminal device, second signaling, wherein the second signaling carries first configuration information, and the first configuration information is used to configure the N CSI-RS resources.

10. A channel state measurement apparatus, comprising:
  at least one processor;
  one or more memories coupled to the at least one processor and storing programming instructions for execution by the at least one processor to select, from N channel state information-reference signal (CSI-RS) resources, a target CSI-RS resource and a target channel state information-interference measurement (CSI-IM) resource group associated with the target CSI-RS resource, wherein the target CSI-IM resource group comprises a CSI-RS resource in the N CSI-RS resources, an $i^{th}$ CSI-RS resource in the N CSI-RS resources is associated with $n_i$ CSI-IM resource groups, and a $k^{th}$ CSI-IM resource group in the $n_i$ CSI-IM resource groups comprises $x_{ik}$ CSI-RS resources in the N CSI-RS resources except the $i^{th}$ CSI-RS resource, wherein N, i, $n_i$, k, and $x_{ik}$ are all integers, $N \geq 2$, $1 \leq n_i \leq N$, $k=1, 2, \ldots, n_i$, $0 \leq x_{ik} \leq N-1$, $j \in \{1, 2, \ldots, N\}$, and $n_j \geq 2$, and wherein the quantity $n_i$ of CSI-IM resource groups associated with the $i^{th}$ CSI-RS resource meets $1 \leq n_i \leq N_1$, $N_1$, is an integer, and $2 \leq N_1 \leq N$; and
  a transmitter, the transmitter configured to send first indication information by using first signaling, wherein the first indication information indicates the target CSI-RS resource and the target CSI-IM resource group, the first indication information comprises $\lceil \log_2 N \rceil + \lceil \log_2 N_1 \rceil$ bits, the $\lceil \log_2 N \rceil$ bits indicate the target CSI-RS resource, and the $\lceil \log_2 N_1 \rceil$ bits indicate the target CSI-IM resource group.

11. The apparatus according to claim 10, wherein in $n_j$ CSI-IM resource groups associated with a $j^{th}$ CSI-RS resource in the N CSI-RS resources, different CSI-IM resource groups comprise different quantities of CSI-RS resources.

12. The apparatus according to claim 10, wherein identifiers of the N CSI-RS resources are 1, 2, . . . , N, and a set of identifiers of CSI-RS resources comprised in the $k^{th}$ CSI-IM resource group in the $n_i$ CSI-IM resource groups associated with the $i^{th}$ CSI-RS resource is:

$$\left\{ \left\lfloor \frac{i-1}{x_{ik}+1} \right\rfloor (x_{ik}+1) + 1, \left\lfloor \frac{i-1}{x_{ik}+1} \right\rfloor (x_{ik}+1) + 2, \ldots, \right.$$

$$\left. \left\lfloor \frac{i-1}{x_{ik}+1} \right\rfloor (x_{ik}+1) + x_{ik} + 1 \right\} \Big/ \{i\},$$

a set A/a set B represents a set of remaining elements in the set A after elements in the set B are removed from the set A.

13. A channel state measurement apparatus, comprising:
  a receiver, the receiver configured to receive first signaling, wherein the first signaling carries first indication information, the first indication information indicates a target channel state information-reference signal (CSI-RS) resource and a target channel state information-interference measurement (CSI-IM) resource group, the target CSI-IM resource group comprises a CSI-RS resource in the N CSI-RS resources, an $i^{th}$ CSI-RS resource in the N CSI-RS resources is associated with $n_i$ CSI-IM resource groups, and a $k^{th}$ CSI-IM resource group in the $n_i$ CSI-IM resource groups comprises $x_{ik}$ CSI-RS resources in the N CSI-RS resources except the $i^{th}$ CSI-RS resource, wherein N, i, $n_i$, k, and $x_{ik}$ are all integers, N≥2, 1≤$n_i$≤N, k=1, 2, . . . , $n_i$, 0≤$x_{ik}$≤N−1, j∈{1, 2, . . . , N}, and $n_j$≥2, wherein the quantity $n_i$ of CSI-IM resource groups associated with the $i^{th}$ CSI-RS resource meets 1≤$n_i$≤$N_1$, $N_1$, is an integer, and 2≤$N_1$≤N, and wherein the first indication information comprises ⌈$\log_2$ N⌉+⌈$\log_2$ $N_1$⌉ bits, the ⌈$\log_2$ N⌉ bits indicate the target CSI-RS resource, and the ⌈$\log_2$ $N_1$⌉ bits indicate the target CSI-IM resource group; and a transmitter, the transmitter configured to report a channel quality indicator (CQI), wherein the CQI is determined based on a channel coefficient measured by the apparatus on the target CSI-RS resource and interference measured by the apparatus on the CSI-RS resource in the target CSI-IM resource group.

14. The apparatus according to claim 13, wherein in $n_j$ CSI-IM resource groups associated with a $j^{th}$ CSI-RS resource in the N CSI-RS resources, different CSI-IM resource groups comprise different quantities of CSI-RS resources.

15. The apparatus according to claim 13, wherein identifiers of the N CSI-RS resources are 1, 2, . . . , N, and a set of identifiers of CSI-RS resources comprised in the $k^{th}$ CSI-IM resource group in the $n_i$ CSI-IM resource groups associated with the $i^{th}$ CSI-RS resource is:

$$\left\{\left\lfloor\frac{i-1}{x_{ik}+1}\right\rfloor(x_{ik}+1)+1, \left\lfloor\frac{i-1}{x_{ik}+1}\right\rfloor(x_{ik}+1)+2, \ldots, \left\lfloor\frac{i-1}{x_{ik}+1}\right\rfloor(x_{ik}+1)+x_{ik}+1\right\}\Big/\{i\},$$

wherein
a set A/a set B represents a set of remaining elements in the set A after elements in the set B are removed from the set A.

16. The apparatus according to any one of claim 13, wherein identifiers of the N CSI-RS resources are 1, 2, . . . , N, a quantity of CSI-IM resource groups associated with the $i^{th}$ CSI-RS resource is $n_i$=N+1−i, and a set of identifiers of CSI-RS resources comprised in the $k^{th}$ CSI-IM resource group is:

{1,2, . . . , i+k−1}/{i}, wherein a set A/a set B represents a set of remaining elements in the set A after elements in the set B are removed from the set A.

17. The apparatus according to any one of claim 13, wherein the N CSI-RS resources are non-zero power CSI-RS resources, and each CSI-IM resource group further comprises a zero power CSI-RS resource.

18. The apparatus according to any one of claim 13, wherein the receiver is further configured to:
receive second signaling before receiving the first signaling, wherein the second signaling carries first configuration information, and the first configuration information is used to configure the N CSI-RS resources.

* * * * *

UNITED STATES PATENT AND TRADEMARK OFFICE
CERTIFICATE OF CORRECTION

PATENT NO. : 11,381,291 B2
APPLICATION NO. : 16/715821
DATED : July 5, 2022
INVENTOR(S) : Ruiqi Zhang, Xueru Li and Di Zhang It is certified that error appears in the above-identified patent and that said Letters Patent is hereby corrected as shown below:

On the Title Page

Column 2 item (57) (Abstract), Line 3-4, delete "information reference" and insert
-- information-reference --.

In the Specification

In Column 1, Line 10, delete "2017," and insert -- 2017. --.

In the Claims

In Column 36, Line 44, in Claim 1, delete "$N_1$," and insert -- $N_1$ --.
In Column 36, Line 59, in Claim 3, delete ",N," and insert -- , N, --.
In Column 37, Line 27 (approx.), in Claim 4, delete "$N_1$," and insert -- $N_1$ --.
In Column 38, Line 32 (approx.), in Claim 10, delete "$N_1$," and insert -- $N_1$ --.
In Column 38, Line 58, in Claim 12, above "a" insert -- wherein --.
In Column 39, Line 12 (approx.), in Claim 13, delete "$N_1$," and insert -- $N_1$ --.
In Column 40, Line 12 (approx.), in Claim 16, after "to" delete "any one of".
In Column 40, Line 22, in Claim 17, after "to" delete "any one of".
In Column 40, Line 26, in Claim 18, after "to" delete "any one of".

Signed and Sealed this
Eighteenth Day of October, 2022

Katherine Kelly Vidal
*Director of the United States Patent and Trademark Office*